(12) United States Patent
Chiba

(10) Patent No.: US 11,722,620 B2
(45) Date of Patent: Aug. 8, 2023

(54) INFORMATION PROCESSING SYSTEM AND METHOD OF CONTROLLING INFORMATION PROCESSING SYSTEM

(71) Applicant: CANON KABUSHIKI KAISHA, Tokyo (JP)

(72) Inventor: Shinichi Chiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/572,369

(22) Filed: Jan. 10, 2022

(65) Prior Publication Data

US 2022/0131993 A1 Apr. 28, 2022

Related U.S. Application Data

(63) Continuation of application No. 17/167,288, filed on Feb. 4, 2021, now Pat. No. 11,258,918.

(30) Foreign Application Priority Data

Feb. 28, 2020 (JP) .................... 2020-033884
Oct. 9, 2020 (JP) .................... 2020-171563

(51) Int. Cl.
*H04N 1/00* (2006.01)
*H04N 1/44* (2006.01)

(52) U.S. Cl.
CPC ....... *H04N 1/00973* (2013.01); *H04N 1/4413* (2013.01); *H04N 1/4433* (2013.01)

(58) Field of Classification Search
CPC . H04N 1/00973; H04N 1/4433; H04N 1/4413
See application file for complete search history.

(56) References Cited

U.S. PATENT DOCUMENTS

| | | | |
|---|---|---|---|
| 2004/0252335 A1* | 12/2004 | Yano | H04N 1/00278 358/1.15 |
| 2005/0017075 A1* | 1/2005 | Chou | G03G 15/5016 235/454 |
| 2007/0250917 A1* | 10/2007 | Bruchertseifer | H04W 12/02 726/5 |
| 2018/0048471 A1* | 2/2018 | Yasaki | H04W 12/50 |

\* cited by examiner

*Primary Examiner* — King Y Poon
*Assistant Examiner* — Michael L Burleson
(74) *Attorney, Agent, or Firm* — Canon U.S.A., Inc. IP Division

(57) ABSTRACT

An image forming apparatus includes at least one first processor and at least one first memory coupled to the first processor and having stored thereon instructions, when executed by the first processor, and cooperating to act as a determination unit configured to determine whether a password set to the image forming apparatus is an initial password, a lock function setting unit configured to enable a lock function preventing the setting of the image forming apparatus from being changed with an operation unit or an operation screen of the image forming apparatus, and a control unit configured to perform control so that a screen of a setting to operate the image forming apparatus via a client terminal is not displayed in response to the password being the initial password as the password.

5 Claims, 23 Drawing Sheets

```
ADMINISTRATIVE SETTING EDITING                    LAST UPDATE:    KEYLOCK CANNOT BE SET
                                                                  WITH CURRENT SETTING.
SETTINGS WILL BE CHANGED AS FOLLOWS. (SOME SETTING CHANGES WILL BE ENABLED WHEN MAIN POWER IS TU    NEXT TIME.)
                                                          [ OK ]   [ CANCEL ]
```

AUTHENTICATE ADMINISTRATIVE SETTING EDITING

CURRENT SYSTEM ADMINISTRATOR PASSWORD: [1234567]

SYSTEM ADMINISTRATOR INFORMATION

SYSTEM ADMINISTRATOR PASSWORD:    SET.

☑ SET/CHANGE PASSWORD

PASSWORD:  [7654321]  (UP TO 16 CHARACTERS)

ENTER AGAIN FOR CONFIRMATION: [7654321]  (UP TO 16 CHARACTERS)

SYSTEM ADMINISTRATOR NAME: [ ]

CONTACT: [ ]

EMAIL ADDRESS: [ ]

SYSTEM ADMINISTRATOR COMMENT: [ ]

DEVICE INFORMATION

DEVICE NAME: [ ]

INSTALLED LOCATION: [ ]

PRINTER JOB LIMITATION

☐ LIMIT PRINTER JOB

GENERAL USER JOB OPERATION SETTING

☐ PERMIT GENERAL USER JOB OPERATION

KEYLOCK SETTING

KEYS TO BE LOCKED:
- ☑ SETUP KEY
- ☐ JOB KEY
- ☐ JOB CHECK/STOP KEY
- ☐ OK KEY
- ☐ RESET KEY
- ☐ SHEET FEEDER SELECTION KEY
- ☐ UTILITY KEY
- ☐ OPERATION UNIT POWER SWITCH (SUB-POWER)

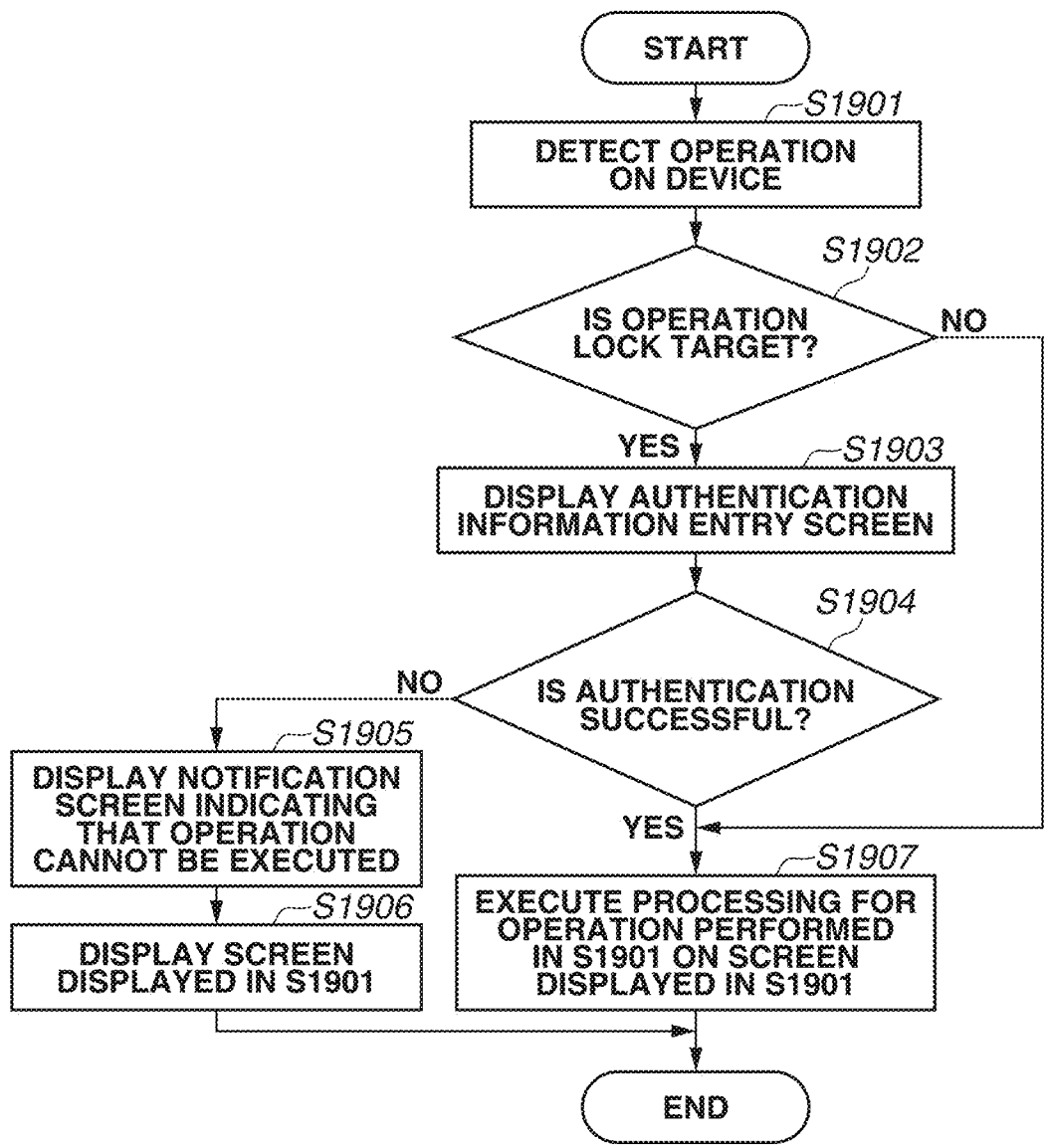

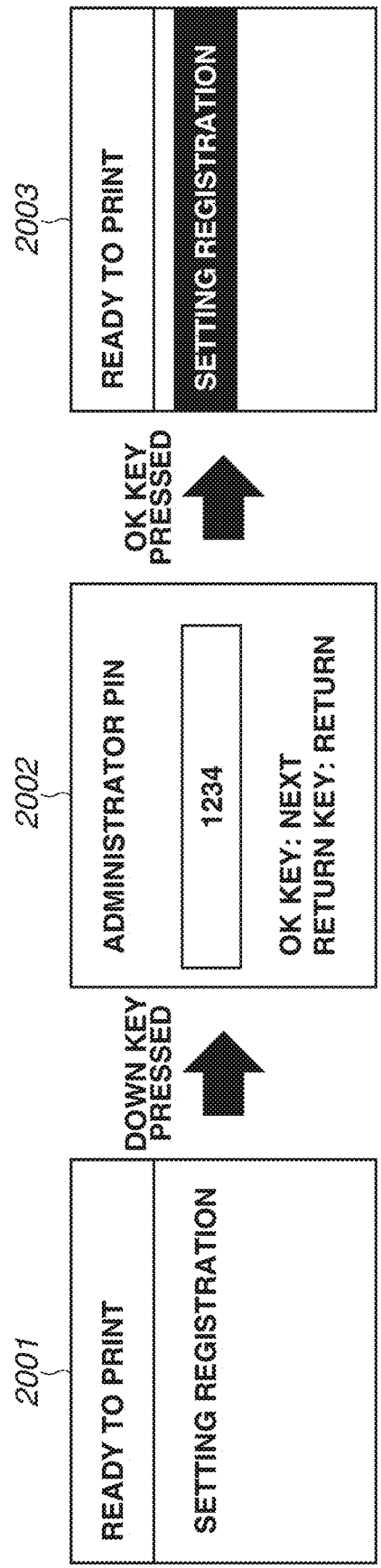

INFORMATION PROCESSING SYSTEM AND METHOD OF CONTROLLING INFORMATION PROCESSING SYSTEM

CROSS-REFERENCE TO RELATED APPLICATIONS

This application is a continuation application of U.S. patent application Ser. No. 17/167,288, filed on Feb. 4, 2021, which claims the benefit of Japanese Patent Applications No. 2020-033884, filed Feb. 28, 2020, and No. 2020-171563, filed Oct. 9, 2020, each of which are hereby incorporated by reference herein in their entirety.

BACKGROUND

Field of the Disclosure

The present disclosure relates to information processing systems that include a user authentication function and to methods of controlling an information processing system.

Description of the Related Art

Recent image forming apparatuses such as multi-function peripherals and printers include various functions. The functions include a lock function that prevents changes of settings of the image forming apparatus. For example, Japanese Patent Application Laid-Open No. 2016-201707 discusses a keylock mechanism that precludes setting changes with a specific member of an image forming apparatus. The keylock function prevents setting changes that are not intended by an administrator of the image forming apparatus are prevented.

Meanwhile, functions of image forming apparatuses include a function that performs operations and changes settings not only on a local screen but also on a screen (remote user interface (remote UI)) of a client terminal such as a personal computer (PC). For example, Japanese Patent Application Laid-Open No. 2018-197918 discusses operations of an image forming apparatus using a mobile terminal.

SUMMARY

To solve the above-described issue, an information processing system according to an aspect of the present disclosure includes the following features.

According to an aspect of the present disclosure, an information processing system includes an image forming apparatus and a client terminal configured to change a setting of the image forming apparatus. The image forming apparatus includes at least one first processor and at least one first memory coupled to the first processor and having stored thereon instructions, when executed by the first processor, and cooperating to act as a determination unit configured to determine whether a password set to the image forming apparatus is an initial password, a lock function setting unit configured to enable a lock function preventing the setting of the image forming apparatus from being changed with an operation unit or an operation screen of the image forming apparatus, and a control unit configured to perform control so that a screen of a setting to operate the image forming apparatus via the client terminal is not displayed in response to the password being the initial password. In response to an instruction to enable the lock function by the lock function setting unit being received and to the determination unit determining that the password is the initial password, the lock function is not enabled.

Further features of the present disclosure will become apparent from the following description of exemplary embodiments with reference to the attached drawings.

BRIEF DESCRIPTION OF THE DRAWINGS

FIG. 4 illustrates a screen flow diagram for password setting from a remote user interface (remote UI) according to one or more aspects of the present disclosure.

FIG. 18 illustrates an example of the remote screen of a client terminal according to one or more aspects of the present disclosure FIG. 19 is a flowchart for a limitation target operation performed with a limitation function enabled according to one or more aspects of the present disclosure.

FIG. 20 illustrates a screen flow diagram for cancelling the limitation function successfully according to one or more aspects of the present disclosure.

DESCRIPTION OF THE EMBODIMENTS

As security awareness has increased in recent years, operations of devices using an initial password are often prohibited. For example, when a user attempts to operate a device remotely using an unchanged initial password, an issue arises in the device that includes a keylock function.

The keylock function is a control function that prevents device settings from being changed via a local user interface (local UI). Once the keylock function is enabled, a cancellation operation is executable only via a remote user interface (remote UI). Specifically, enabling the keylock function of the device with an initial password set to the device results in an inoperable state where the settings cannot be changed via the local UI or via the remote UI.

The present disclosure is based on the foregoing issue and is directed to a technique for preventing a device from being brought into the inoperable state by not permitting simultaneous setting of a value that enables the keylock function and of an initial password value as device setting values.

The best mode for carrying out the present disclosure will be described below with reference to the drawings.

Various exemplary embodiments of the present disclosure will be described below with reference to the drawings. It should be noted that the exemplary embodiments described below are not intended to limit the scope of the claimed disclosure and that not every combination of features described in the exemplary embodiments is always used to a technical solution of the disclosure.

Figure 1:
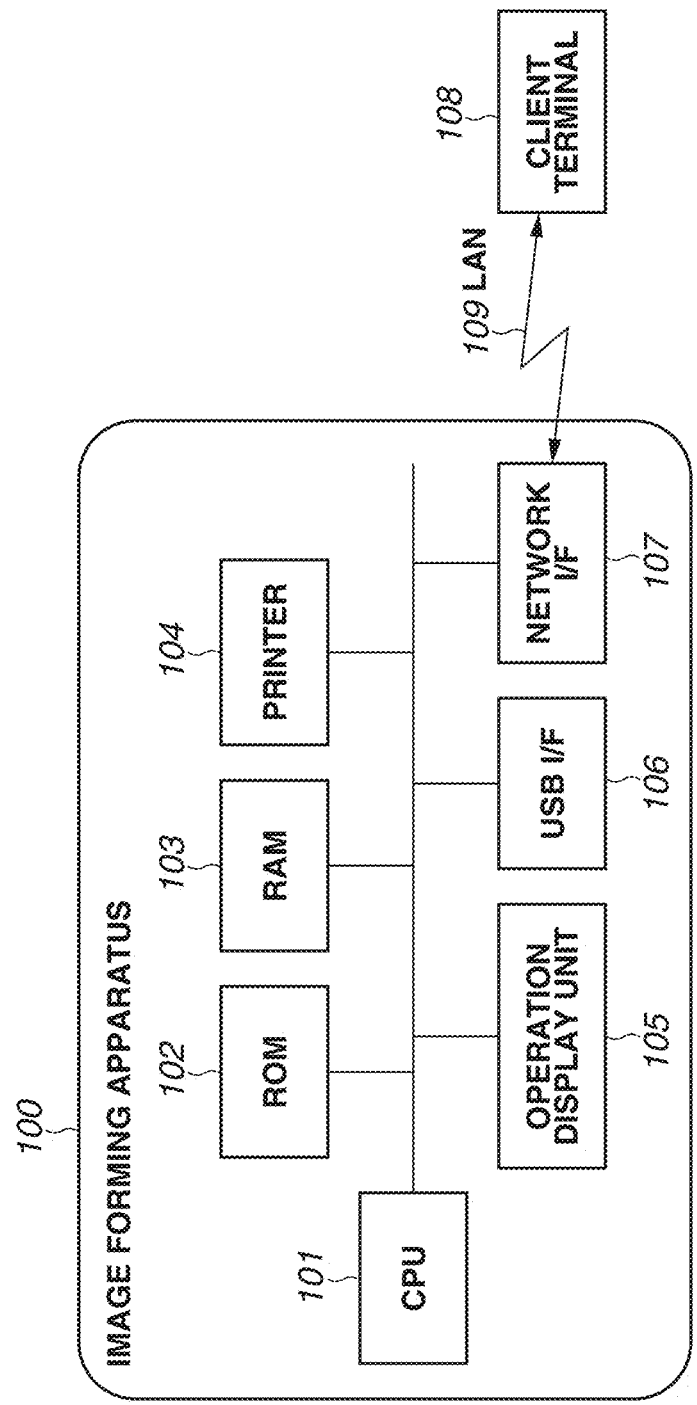
FIG. 1 is a block diagram illustrating an image forming apparatus according to one or more aspects of the present disclosure.

FIG. 1 illustrates the configuration of an information processing system that includes an image forming apparatus 100 according to an exemplary embodiment of the present disclosure.

In FIG. 1, the image forming apparatus 100 includes a central processing unit (CPU) 101, a read-only memory (ROM) 102, a random access memory (RAM) 103, a printer 104, and an operation display unit 105. Further, the image forming apparatus 100 includes a universal serial bus (USB) interface (I/F) 106 and a network I/F 107 as communication I/Fs with external devices.

The CPU 101 is a system control unit and controls the entire image forming apparatus 100.

The ROM 102 stores a control program of the CPU 101. The control program is a control program for executing the exemplary embodiment described below. Further, types of the ROM 102 include rewritable flash ROMs, and the ROM 102 stores setting values registered by a user of the image forming apparatus 100 and management data.

Further, the ROM 102 manages setting values of various settings of the image forming apparatus 100. The ROM 102 manages at least a setting value (ON/OFF) as to whether a keylock function setting is enabled and a setting value (ON/OFF) as to whether a remote UI function setting is enabled. Details of the settings will be described below.

The RAM 103 stores execution programs, program control variables, various work buffers, some of the setting values registered by the user of the image forming apparatus 100, and management data.

The printer 104 records received images and file data on recording sheets.

The operation display unit 105 includes a numeric keypad, a keyboard, a touch panel, a liquid crystal display (LCD), and a light emitting diode (LED). The operation display unit 105 receives various user operations, displays operation screens, and provides notifications to the user. While an example is described herein in which the image forming apparatus 100 is operated with the numeric keypad, all operation keys may be software keys, or some of the operation keys may be software keys and the rest be hardware keys.

The USB I/F 106 connects to, communicates with, and supplies power to USB devices.

The network I/F 107 transmits data to and receives data from the units of the image forming apparatus 100 via a local area network (LAN) 109. Especially, the network I/F 107 receives print jobs from a client terminal 108 and receives control information on the image forming apparatus 100 with a remote UI (RUI) function. The LAN 109 includes a LAN that performs wired communication (wired LAN) and a LAN that performs wireless communication (wireless LAN).

While the hardware configuration diagram of the image forming apparatus 100 is described above with reference to FIG. 1, the hardware configuration diagram of the client terminal 108 is similar to that of the image forming apparatus 100, so that redundant descriptions thereof are omitted.

Figure 16A:
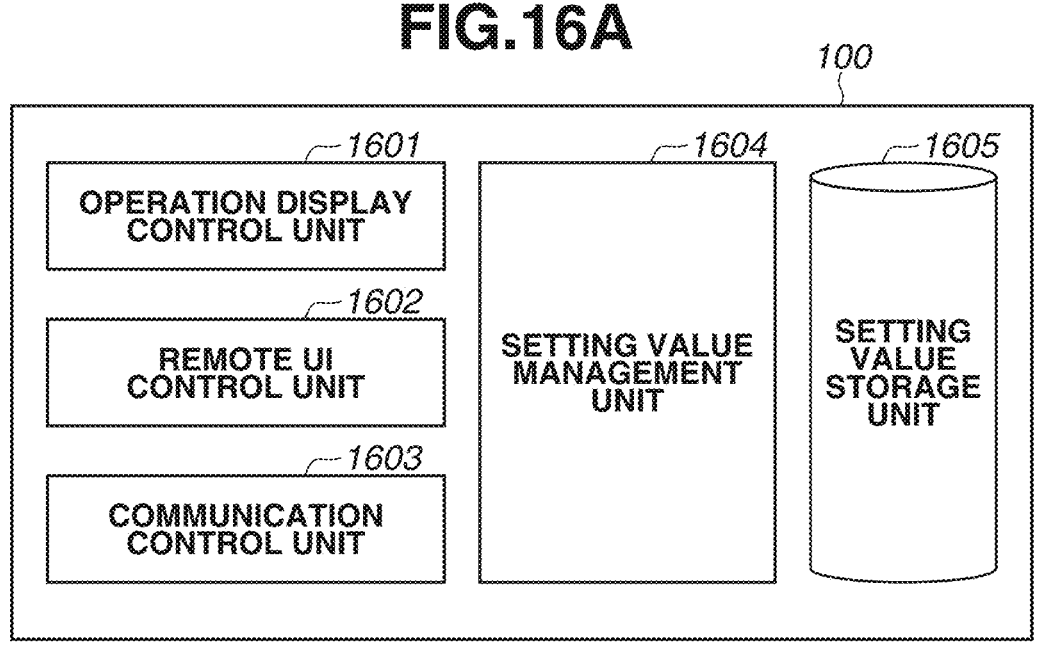
FIGS. 16A and 16B each are a software block diagram illustrating an image forming apparatus and a terminal according to one or more aspects of the present disclosure.
Figure 16B:
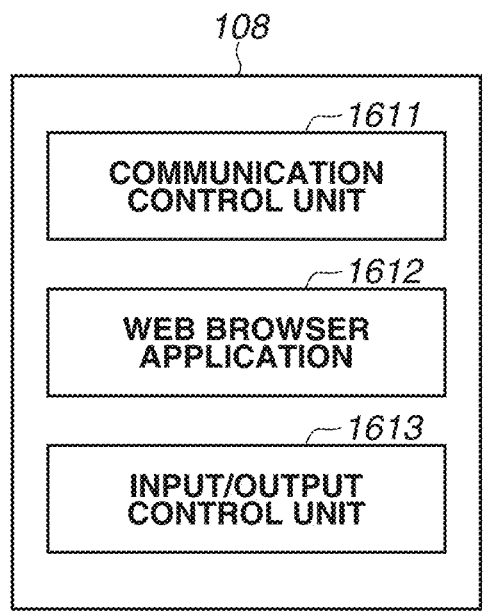

FIGS. 16A and 16B illustrate a software configuration of the image forming apparatus 100 and a software configuration of the client terminal 108 according to an exemplary embodiment of the present disclosure, respectively.

An operation display control unit 1601 of the image forming apparatus 100 controls receipt of data input to the image forming apparatus 100 and display of output results. A remote UI control unit 1602 controls the whole remote UI function, such as data generation and image layout in the remote UI function. A communication control unit 1603 controls transmission of data generated by the operation display control unit 1601 and/or by the remote UI control unit 1602 to the client terminal 108 and controls receipt of data from the client terminal 108. A setting value management unit 1604, for example, controls setting value changing processing on a setting value storage unit 1605 in response to a setting value change request from the operation display control unit 1601.

A communication control unit 1611 of the client terminal 108 controls transmission of data to and receipt of data from the image forming apparatus 100. A web browser application 1612 is an application that is used in the remote UI function. When the web browser application 1612 executes access processing, data for the remote UI function is requested and displayed via the communication control unit 1611. An input/output control unit 1613 receives input data for activation of the web browser application 1612 and displays results obtained by processing by the web browser application 1612.

Figure 17:
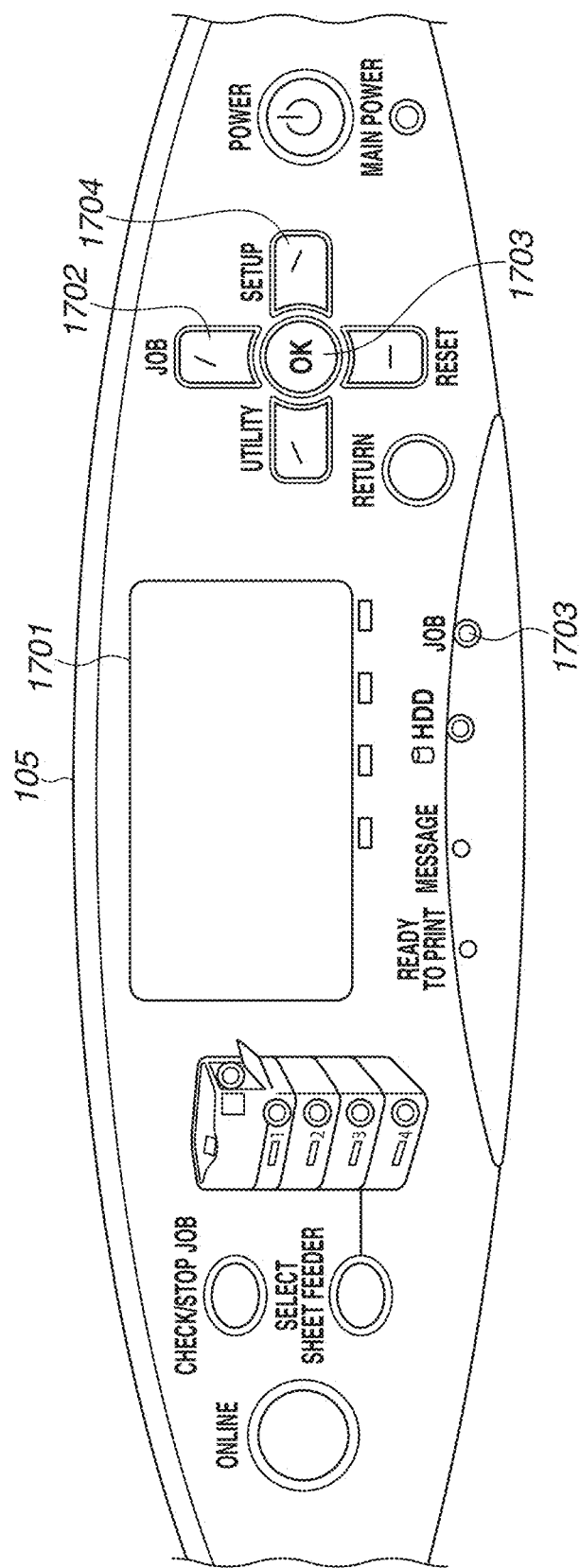
FIG. 17 illustrates an operation display unit according to one or more aspects of the present disclosure.

FIG. 17 illustrates details of the operation display unit 105 of the image forming apparatus 100 according to an exemplary embodiment of the present disclosure.

A display unit 1701 displays statuses of the image forming apparatus 100 and input/output results. A function of calling a job-related function and a function of moving a selecting cursor upward on a selecting screen are assigned to a job key 1702. A setup key 1704 is a key for displaying an administrative setting screen via which a password setting, a keylock function setting, and a remote UI function setting can be changed. The keylock function is a function of disabling the operation of the hardware keys including at least the setup key 1704. As a result, the settings of the image forming apparatus 100 can no longer be changed via the administrative setting screen. Although the keylock function is described as a function that disables the operation of the setup key 1704 in the present exemplary embodiment, the keylock function has at least a function to disable a setting change on the image forming apparatus 100, and the functionality of the keylock function is not limited to a specific hard key. For example, the keylock function may be a function to gray out a software key for setting change on the display unit 1701.

A notification LED 1703 is an LED for notifications of statuses of the image forming apparatus 100. The notifications include a notification by an operation, such as lighting or blinking, and a notification by color.

Figure 2:
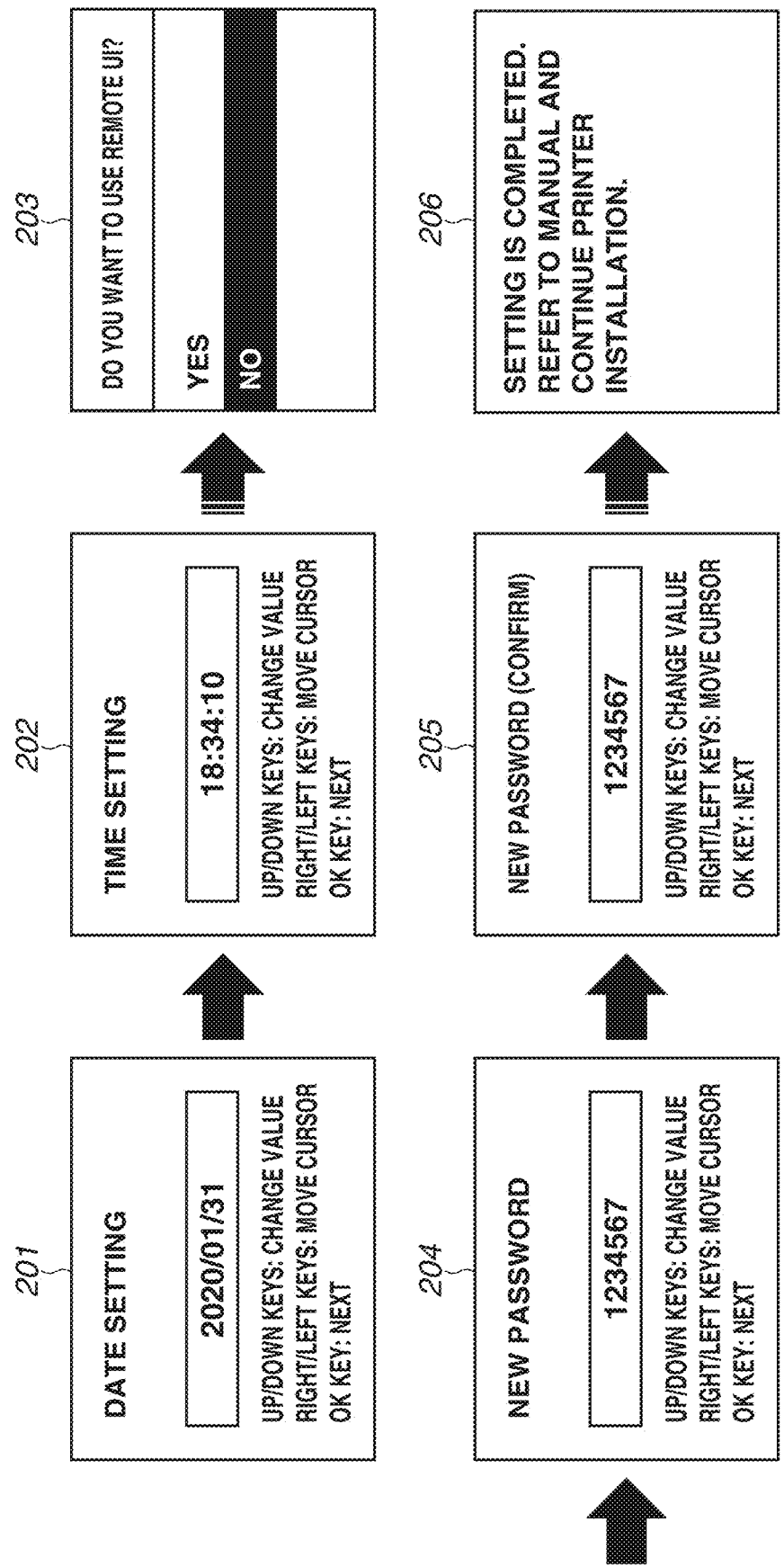
FIG. 2 illustrates a screen flow diagram for password setting in a setting navigation function that is executed when the image forming apparatus is turned on for the first time according to one or more aspects of the present disclosure.

FIG. 2 illustrates a screen flow diagram in a setting navigation function that is executed when the image forming apparatus 100 is turned on for the first time.

When the image forming apparatus 100 is turned on for the first time, the CPU 101 displays a date setting screen 201. The user enters date information using the numeric keypad of the operation display unit 105. After the date information is entered, if an OK key (not illustrated) is selected, the CPU 101 displays a time setting screen 202. If time is entered using the numeric keypad and the OK key is selected, the CPU 101 displays a remote setting screen 203. If a remote UI of the client terminal 108 is used, the item "YES" is selected on the remote setting screen 203. Otherwise, the item "NO" is selected.

After the user selects a desired option, if the OK key is selected, the CPU 101 displays a password setting screen 204. Then, if the OK key is selected, the CPU 101 displays a password confirmation screen 205. If a password entered on the password setting screen 204 and a password entered on the password confirmation screen 205 match, the CPU 101 displays a setting navigation completion notification screen 206 and ends the setting navigation function.

When the password setting screen 204 is changed to the password confirmation screen 205, the password setting screen 204 may prompt the user to change an entered initial password and then be changed to the password confirmation screen 205. Alternatively, with a blank entry field displayed in the password setting screen 204, the password setting screen 204 may be changed to the password confirmation screen 205 after the user enters a desired password in.

While the examples are given of displaying the screen for executing the date setting, the time setting, the remote UI function setting, and the password setting by the setting navigation function in the present exemplary embodiment, a screen for setting other functions may be displayed. Further, various setting items in an installation navigation function may include an option for skipping without setting based on the user's intention or a hardware key for selecting. This enables the user to start using the image forming apparatus 100 without changing an initial password that is preset to the image forming apparatus 100. As to other setting items, setting values at the time of shipment of the image forming apparatus 100 are maintained.

<Password Setting in Image Forming Apparatus 100>

Figure 3:
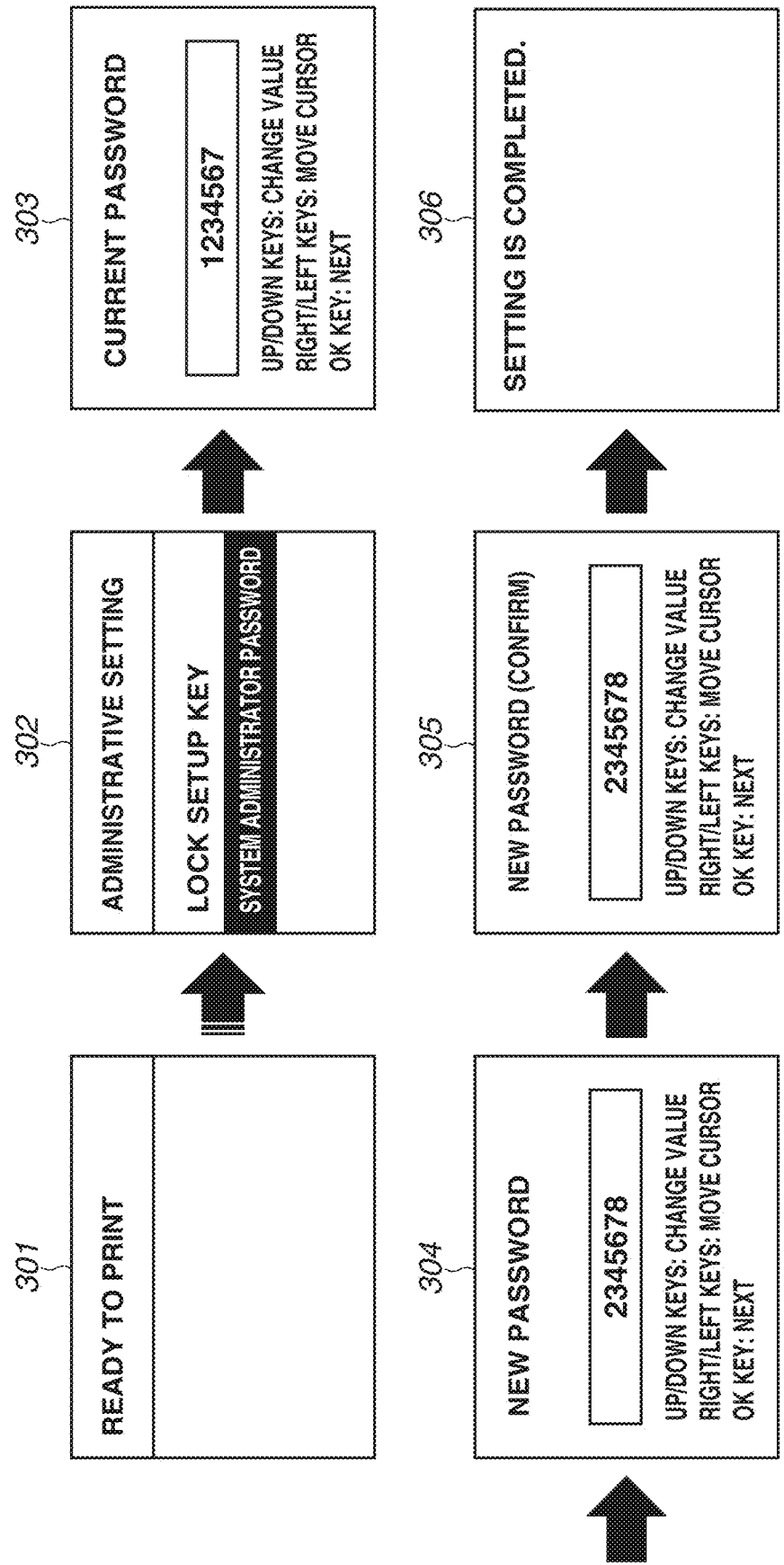
FIG. 3 illustrates a screen flow diagram for password setting according to one or more aspects of the present disclosure.

A screen flow diagram for password setting on the client terminal 108 will be described with reference to FIG. 3. If a setting screen display operation is performed on a top screen 301, the CPU 101 displays an administrative setting screen 302. The setting screen display operation is performed with the setup key 1704 selected with the top screen 301 displayed. The setup key 1704 is a button for moving a focus rightward on an operation screen if the setup key 1704 is selected with a screen other than the top screen 301 displayed.

If the password setting item "system administrator password" is selected on the administrative setting screen 302, the CPU 101 displays a password entry screen 303. When the password entry screen 303 is displayed, an entry field is blank. However, if a current password is entered as illustrated in FIG. 3, the CPU 101 displays a password entry screen 304. If a password (second password) other than the current password is entered, the CPU 101 displays a password entry screen 305. If the password entered on the password entry screen 305 matches the password entered on the password entry screen 304, the CPU 101 displays a screen 306 and ends the setting.

While it is apparent that the second password can be set from the initial password as the current password, the setting can be restored to the initial password from the set second password.

A definition of the initial password will be described. The initial password refers to a password that is set to the image forming apparatus 100 at the time of shipment. While a different password may be set to each of the plurality of image forming apparatuses 100, a common password is set to the plurality of image forming apparatuses 100 in the present exemplary embodiment.

<Password Setting in Client Terminal 108>

Figure 4:
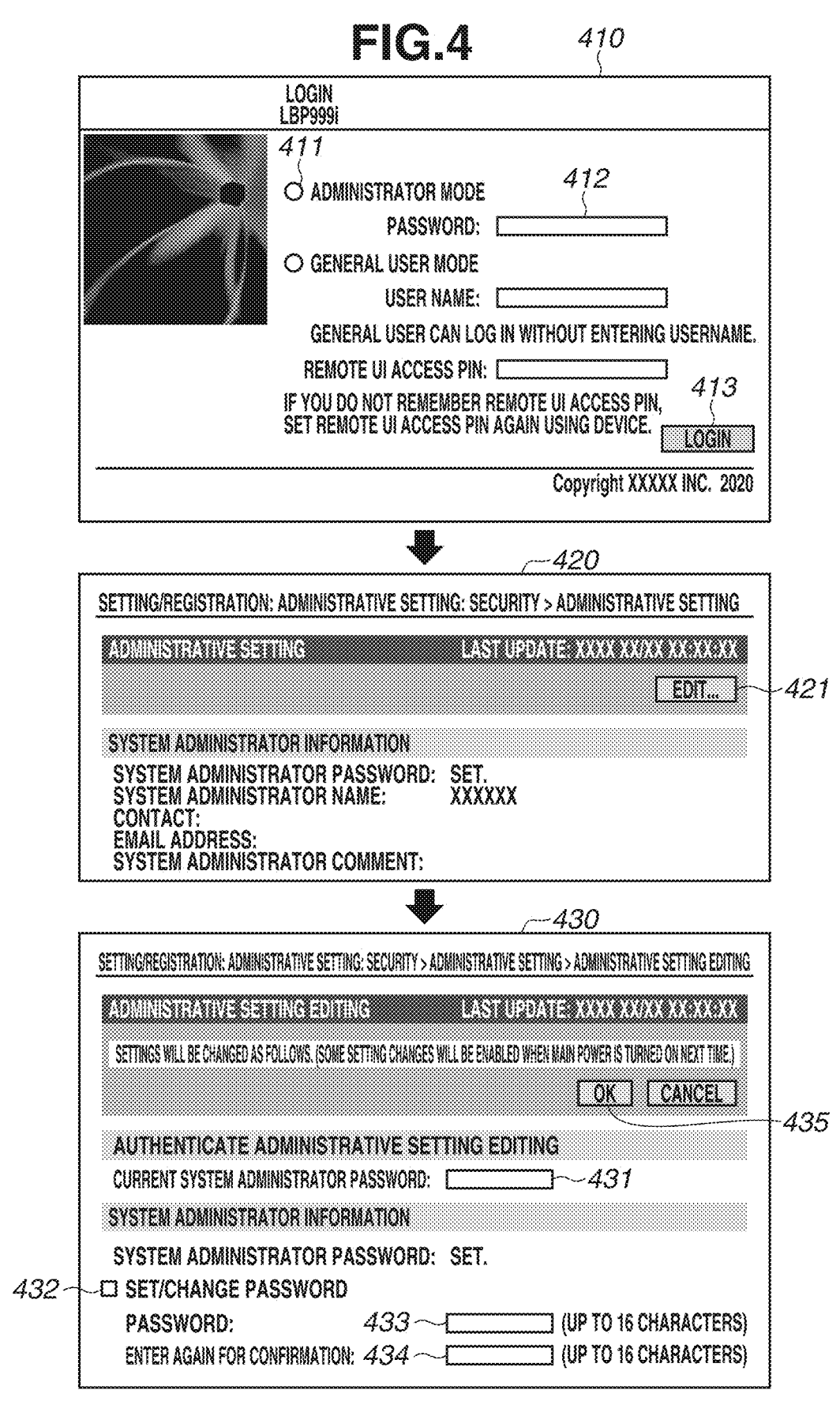

FIG. 4 illustrates a screen flow diagram for password setting via the remote UI of the client terminal 108. To enable operations on the remote UI of the client terminal 108 as illustrated in FIG. 4, the initial password is changed to the second password in advance in the image forming apparatus 100 (FIG. 3). The initial password set to the image forming apparatus 100 prevents the user from logging in to the image forming apparatus 100 even if the initial password is entered on a login screen described below.

Upon start of use of the remote UI function, the CPU 101 displays a login screen 410. While a specific operation method of starting using the remote UI function is not limited, the login screen 410 is displayed if, for example, the Internet Protocol (IP) address of the image forming apparatus 100 is entered on the web browser application 1612 of the client terminal 108. The user selects an administrator mode button 411 and enters the second password set to the image forming apparatus 100 in a password entry field 412. After finishing entering the password, the user presses a login button 413 and logs in to the image forming apparatus 100.

After the login, the CPU 101 displays a setting change screen 420. The setting change screen 420 displays a password set to the image forming apparatus 100, an administrator name, and an email address of the image forming apparatus 100. If an edit button 421 is pressed, the CPU 101 displays a setting change screen 430. The setting change screen 430 displays the setting values changeable displayed on the setting change screen 420. The user selects the password setting button 432 and then enters the password set to the image forming apparatus 100 in a password entry field 431 and enters a new password in password entry fields 433 and 434. If an OK button 435 is pressed, the new password entered in the password entry fields 433 and 434 is set to the image forming apparatus 100. With the initial password entered as the new password in the password entry fields 433 and 434, an error screen may be displayed to notify the user that the initial password cannot be set. Alternatively, the user may be allowed to perform operations on the remote UI of the client terminal 108 until performing a logout operation on the remote UI with setting the initial password not prohibited, not being allowed to log in after the user logs out.

If the user selects a general user mode on the login screen 410 and logs in, a remote screen (not illustrated) for the general user mode is displayed. The remote screen is for checking the settings of the image forming apparatus 100, and the settings cannot be changed on the remote screen.

<Keylock Function Setting>

The keylock function setting is a setting to disable operations of the setup key 1704. As described above, if the setup key 1704 is selected with a top screen 501 (301) displayed, an administrative setting screen 302 is displayed, making it possible for the settings of the image forming apparatus 100 including the password setting to be changed. Disabling operations of the setup key 1704 means that even if the setup key 1704 is pressed, the administrative setting screen 302 is not displayed, with which the settings of the image forming apparatus 100 cannot be changed. The image forming apparatus 100 includes the keylock function setting to prevent the image forming apparatus 100 from being set to settings that are not intended by an administrator.

The term "keylock function" is used in the present exemplary embodiment to describe the disabling of operations of the setup key 1704 as an example, but any lock function that prevents settings from being changed may be employed.

Figure 5:
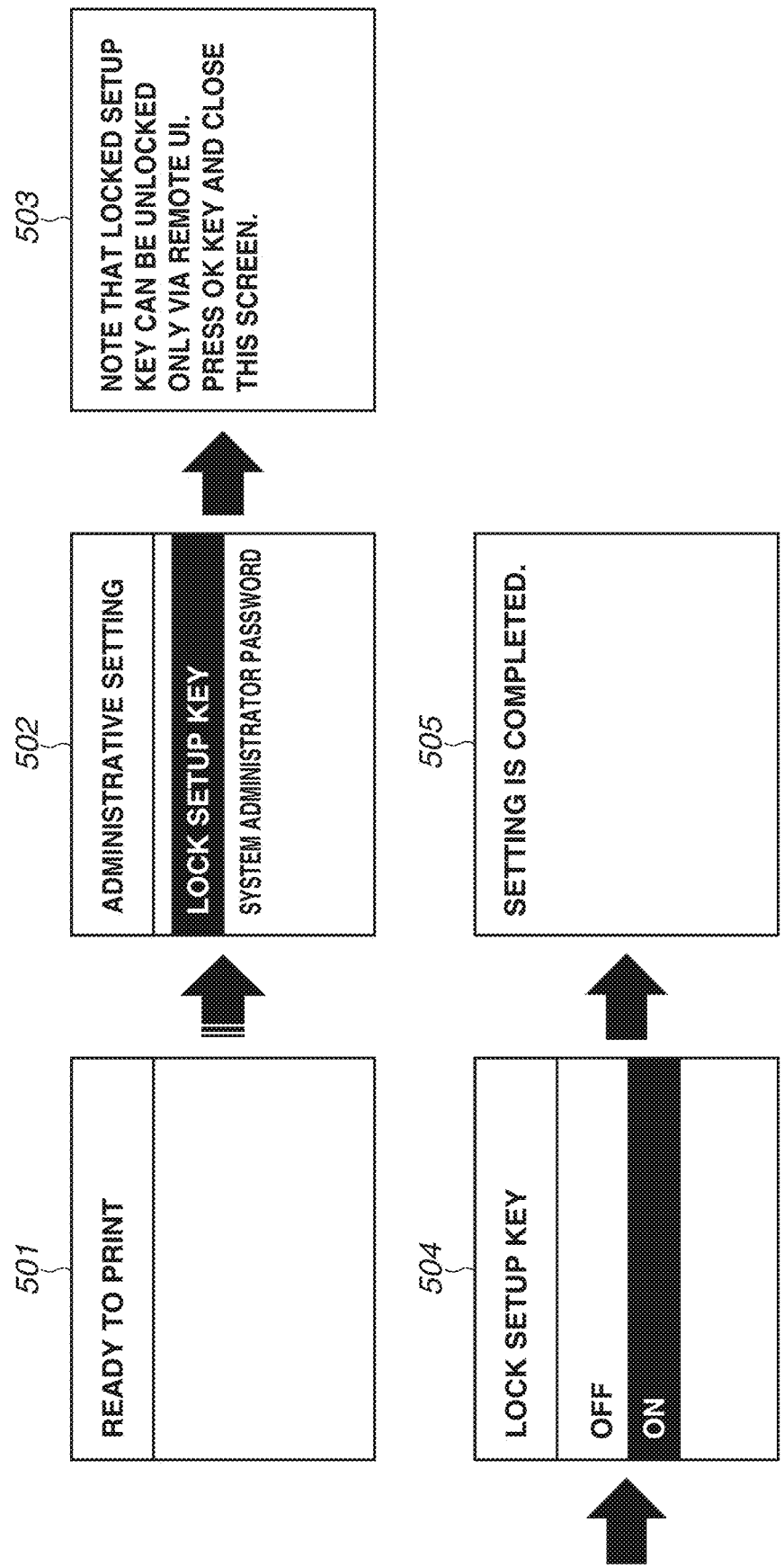
FIG. 5 illustrates a screen flow diagram for keylock function setting according to one or more aspects of the present disclosure.

FIG. 5 illustrates a screen flow diagram for the keylock function setting according to the present exemplary embodiment. If the setup key 1704 is selected on the top screen 501, the CPU 101 displays an administrative setting screen 502. If the setting item "lock setup key" of the keylock function is selected, the CPU 101 displays a keylock warning screen 503. The keylock warning screen 503 displays a notification that the keylock function setting can be cancelled only through operations of the remote UI. If the OK key is selected as prompted by the keylock warning screen 503, the CPU 101 displays a lock setting screen 504. If the user determines the settings, the CPU 101 displays a setting completion notification screen 505 and ends the setting. After the setting is ended, the top screen 501 is displayed, and the administrative setting screen 502 is no longer displayed even if the setup key 1704 is selected.

The screen flow diagram illustrated in FIG. 5 applies to a case with the second password set to the image forming apparatus 100. A screen flow diagram with the keylock function setting selected with the initial password set to the image forming apparatus 100 will be described below.

<Inoperable State>

The inoperable state refers to a state where the settings cannot be changed not only on the local screen of the image forming apparatus 100 but also on the remote UI (remote screen) of the client terminal 108. Specifically, the settings cannot be changed on the local screen due to the keylock function setting, and the settings cannot be changed also on the remote UI because the password is still the initial password. Table 1 shows possible combinations of settings in the image forming apparatus 100. Each setting value combination with "X" in the column "operation state" is the inoperable state.

As shown in Table 1, although the keylock function setting is enabled, with the second password set and the remote UI setting enabled, the settings can be changed via the remote UI. Thus, the combination of the keylock function "ON", the password "second password", and the remote UI "ON" does not bring the image forming apparatus into the inoperable state.

TABLE 1

| | | | |
|---|---|---|---|
| ON | INITIAL PASSWORD | ON | X (INOPERABLE STATE) |
| ON | INITIAL PASSWORD | OFF | X |
| ON | SECOND PASSWORD | ON | |
| ON | SECOND PASSWORD | OFF | X |
| OFF | INITIAL PASSWORD | ON | |
| OFF | INITIAL PASSWORD | OFF | |
| OFF | SECOND PASSWORD | ON | |
| OFF | SECOND PASSWORD | OFF | |

<Processing of Preventing Keylock Function Setting>

Figure 6:
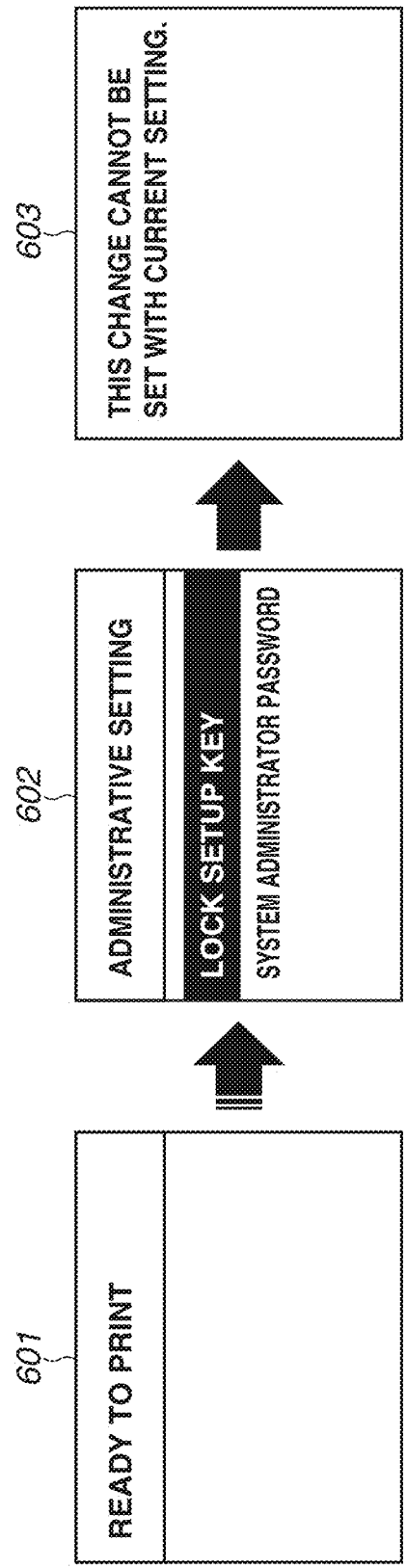
FIG. 6 illustrates a screen flow diagram in a case where a keylock function setting cannot be set according to one or more aspects of the present disclosure.

FIG. 6 illustrates a screen flow diagram to prevent the keylock function setting in the present exemplary embodiment. Either a default value (initial password) "7654321" set at the time of shipment is set to the image forming apparatus 100, or the remote UI setting is set to "OFF".

If a setting screen display operation is performed on a top screen 601, the CPU 101 displays an administrative setting screen 602. If the setting item "lock setup key" of the keylock function is selected, the CPU 101 displays an error screen 603 and ends the setting. The error screen 603 is not limited to the form of the error screen 603 and may be any error screen that notifies the user that the keylock function cannot be set with the initial password set or with the remote UI function not enabled. After the error screen 603 is displayed, the error screen 603 may be changed to the administrative setting screen 602 to prompt the user to change the password.

<Process of Controlling Screen Flow in FIG. 6>

Figure 7:
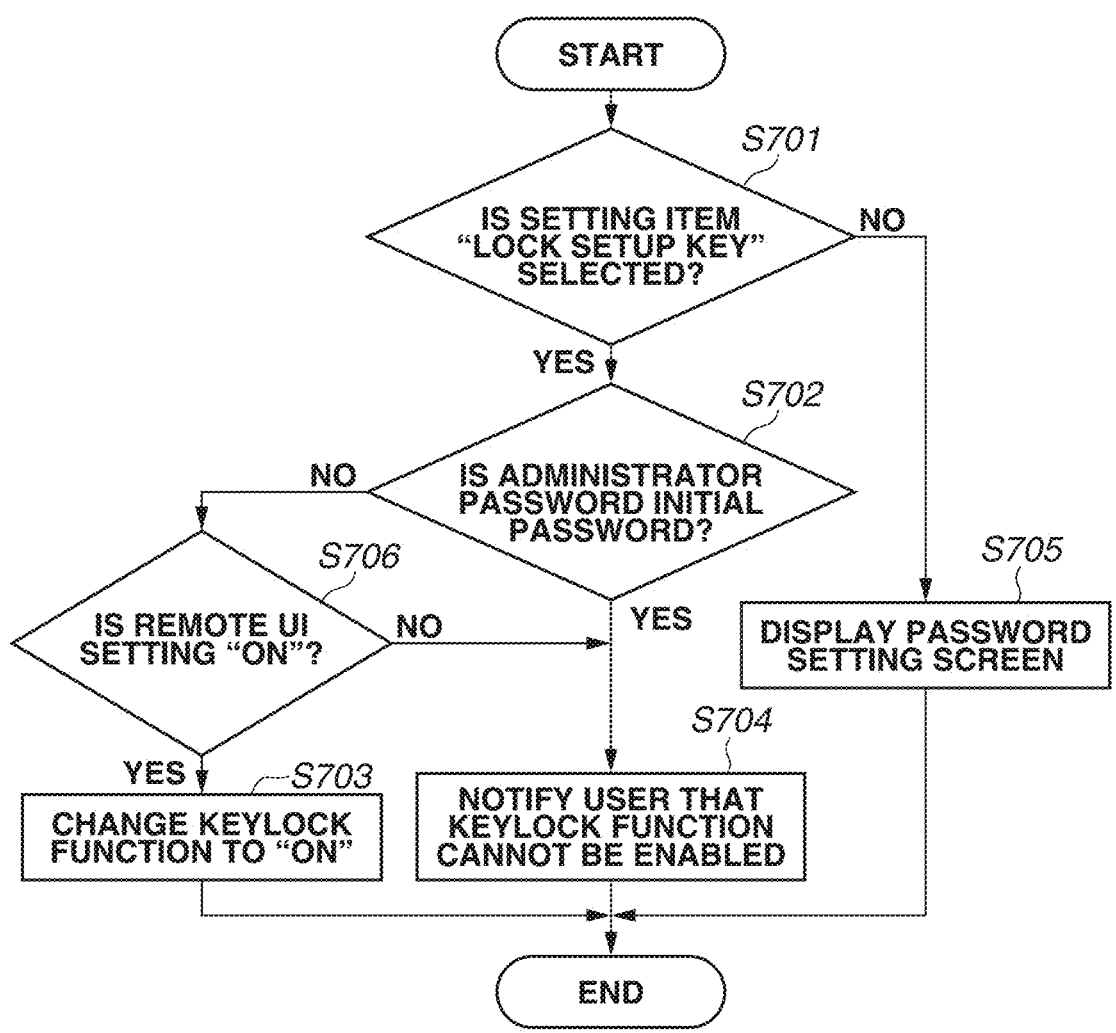
FIG. 7 is a flowchart in the case where the keylock function setting cannot be set according to one or more aspects of the present disclosure.

FIG. 7 is a flowchart illustrating a control method in a case where the keylock function setting cannot be set as illustrated in FIG. 6. The flowchart is started with the CPU 101 displaying the administrative setting screen 602. In step S701, the CPU 101 determines which setting item is selected by a user operation. If the CPU 101 determines that the setting item "system administrator password" is selected (NO in step S701), the processing proceeds to step S705. In step S705, the password setting screen 300 is displayed, and the process is ended. The screen flow after the password setting screen 300 is displayed is similar to that in FIG. 3.

On the other hand, in step S701, if the CPU 101 determines that the setting item "lock setup key" is selected (YES in step S701), the processing proceeds to step 702. In step S702, the CPU 101 determines whether the password is the initial password. The initial password of the image forming apparatus 100 is managed in the ROM 102, and whether the character string of the initial password in the ROM 102 matches the character string of the password set to the image forming apparatus 100 is determined. If the CPU 101 determines that the character strings match (YES in step S702), the processing proceeds to step S704. If the CPU 101 determines that the character strings do not match (NO in step S702), the processing proceeds to step S706. In step S704, the CPU 101 displays the error screen 603, and the process is ended.

If the CPU 101 determines that the initial password is not set in step S702, in step S706, the CPU 101 determines whether the remote UI setting is enabled. If the remote UI setting is not enabled ("NO" is selected on the remote setting screen 203) (NO in step S706), the processing proceeds to step S704. If the remote UI setting is enabled ("YES" is selected on the remote setting screen 203) (YES in step S706), in step S703, the CPU 101 sets the keylock function to "ON", and the process is ended.

<Processing of Preventing Password Setting (Client Terminal 108)>

Operations in preventing the initial password setting on the client terminal 108 will be described. The following descriptions are based on the assumption that the second password is set to the image forming apparatus 100 and administrator login on the client terminal 108 is executable using the second password. An example of a remote screen is as illustrated in FIG. 4. If the user changes the second password to the initial password and selects an OK button 435 on the setting change screen 430, a pop-up indicating that the settings by the user have a problem is displayed. An example thereof is illustrated in FIG. 18.

The notification "keylock cannot be set with current setting" is displayed near the OK button 435. If the OK button 435 is pressed, the CPU 101 checks the settings on the setting change screen 430, and if the keylock function setting is enabled and an instruction to set the initial password is issued, the pop-up is displayed. Thus, the error message is not given to the user operation of setting the initial password but to the settings.

The method of notifying the user of the error and the message content are not particularly limited, and any display method that prompts the user to check details of the password setting and the keylock function setting may be employed.

<Processing of Preventing Password Setting (Image Forming Apparatus 100)>

The setup key 1704 is described above as a keylock function setting target. Alternatively, a button other than the setup key 1704 on the operation display unit 105 may be set as a keylock function setting target. For example, only the button "utility" or "select sheet feeder" displayed on the operation display unit 105 may be set as a keylock function setting target.

The setting items of the keylock function on the client terminal 108 are as illustrated in FIG. 18. If a checkbox of the setting item "keylock setting" is checked, the corresponding button is key-locked, and no processing is executed at the press of the button. In FIG. 18, only the checkbox of the setting item "setup key" is checked.

Figure 8:
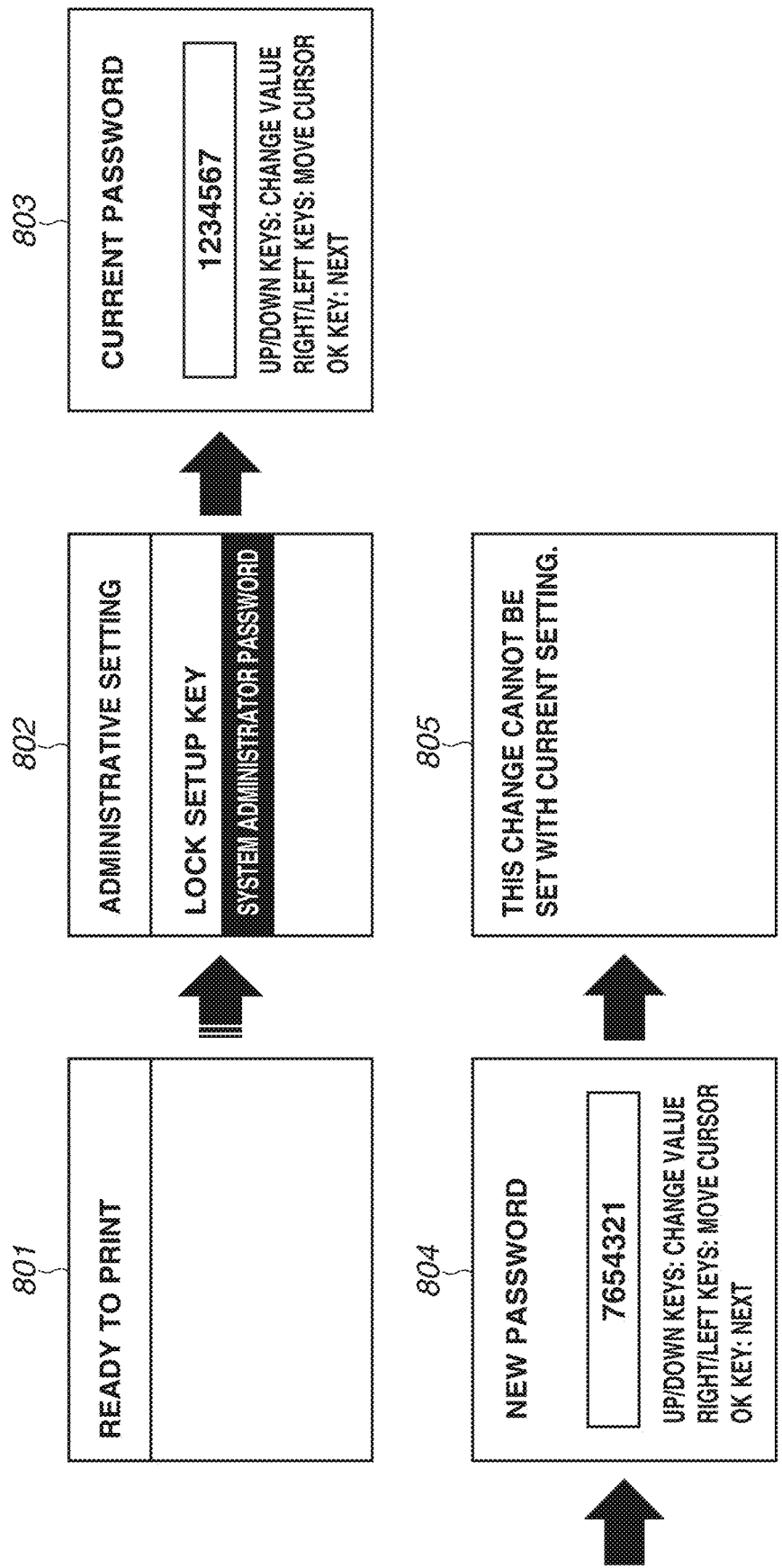
FIG. 8 illustrates a screen flow diagram in a case where a password setting cannot be set according to one or more aspects of the present disclosure.

Depending on the setting of the setting item "keylock setting" in FIG. 18, the image forming apparatus 100 can display an administrative setting screen 802 even if the keylock function is enabled unless the setting is for the setup key 1704. FIG. 8 illustrates a screen flow diagram with a key other than the setup key 1704 key-locked.

FIG. 8 illustrates a screen flow diagram for preventing initial password setting in the present exemplary embodiment. The keylock function of the image forming apparatus 100 is enabled, and the password set to the image forming apparatus 100 is the second password.

If a setting screen display operation is performed (the setup key 1704 is selected) on a top screen 801, the CPU 101 displays the administrative setting screen 802. If the setting item "system administrator password" is selected, the CPU 101 displays a password entry screen 803. If the current password is entered by the user, the CPU 101 displays a password entry screen 804 and prompts the user to enter a new password. If the initial password "7654321" is entered as a new password and the OK key is selected, the CPU 101 displays an error screen 805 and ends the setting. After the setting is ended, the top screen 801 or the administrative setting screen 802 is displayed.

The error screen 805 is not limited to the form of the error screen 805 and may be any error screen that notifies the user, at least, that the initial password cannot be set as a new password with the keylock function enabled. In place of the error screen 805, a lock setting screen may be displayed to prompt the user to cancel the keylock function.

In FIG. 8, the error screen 805 is displayed although a key other than the setup key 1704 is locked. Although the image forming apparatus 100 is not in the inoperable state, the error screen 805 is displayed because it is considered that the image forming apparatus 100 may be brought into the inoperable state with the keylock function on some keys enabled.

<Process of Controlling Screen flow in FIG. 8>

Figure 9:
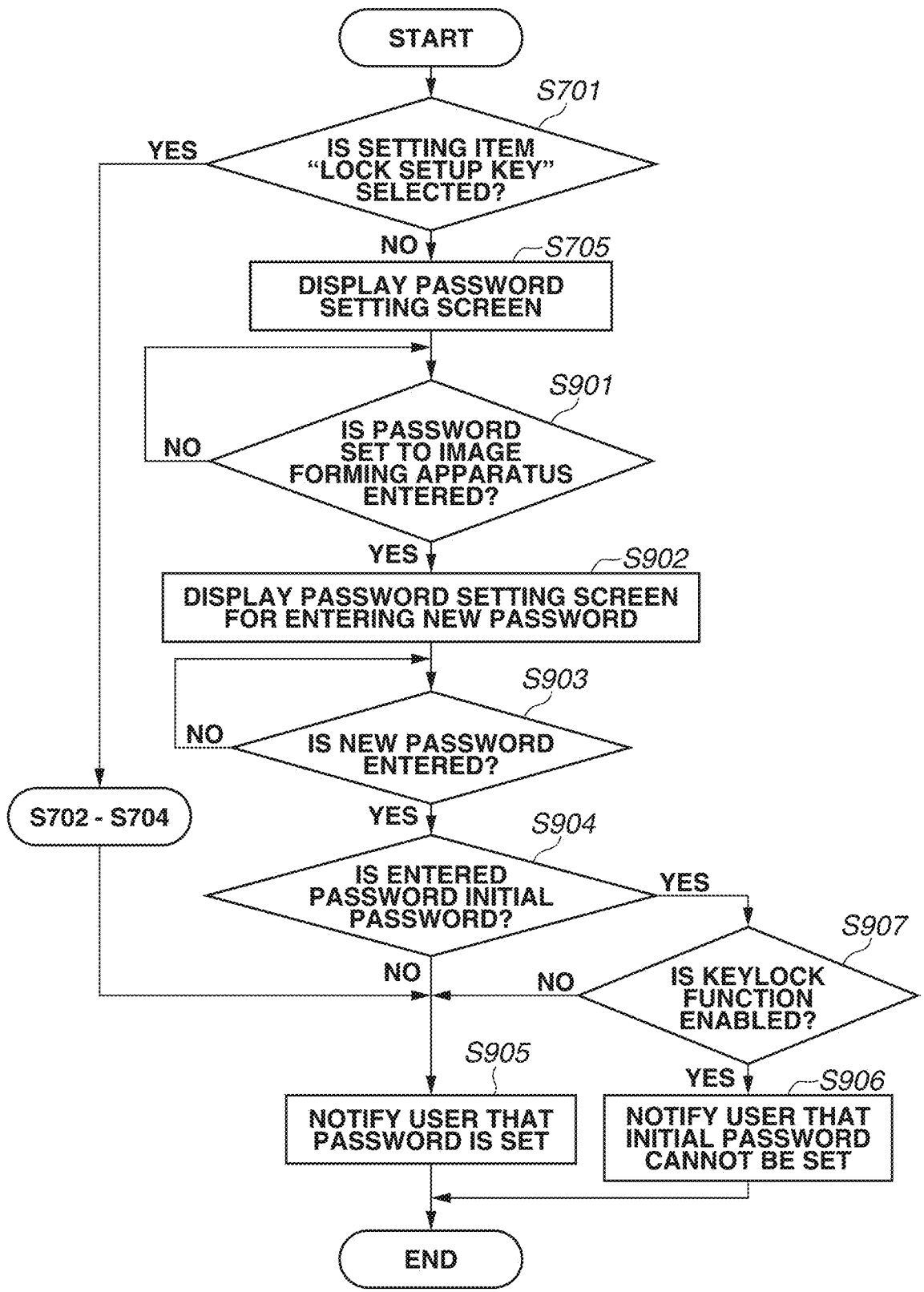
FIG. 9 is a flowchart in the case where the password setting cannot be set according to one or more aspects of the present disclosure.

FIG. 9 is a flowchart for controlling the screen flow in FIG. 8. The flowchart processing is operated at a timing at which the administrative setting screen 802 is displayed. Each step that is described above is given the same reference numeral, and redundant descriptions thereof are omitted.

After the password entry screen 803 is displayed in step S705, in step S901, the CPU 101 waits until it is determined that the password entered on the password entry screen 803 by a user operation matches the password set to the image forming apparatus 100. If it is determined that the password set to the image forming apparatus 100 matches the password entered on the password entry screen 803 (YES in step S901), in step S902, the CPU 101 displays the password entry screen 804 for entering a new password.

In step S903, the CPU 101 waits until it is determined that a new password is entered on the password entry screen 804, and if it is determined that a new password is entered (YES in step S903), in step S904, the CPU 101 determines whether the entered password is the initial password. If the CPU 101 determines that the entered password is not the initial password (NO in step S904), in step S905, the CPU 101 notifies the user that the password entry is completed (e.g., the screen 306), and the process is ended. After the screen 306 is displayed, the top screen 301 may be displayed.

On the other hand, in step S904, if the CPU 101 determines that the initial password is entered (YES in step S904), in step S907, the CPU 101 determines whether the keylock function is enabled. If the CPU 101 determines that the keylock function is not enabled (NO in step S907), the processing proceeds to step S905. On the other hand, if the CPU 101 determines that the keylock function is enabled (YES in step S907), the processing proceeds to step S906. In this determination of whether the keylock function is enabled or disabled, whether the keylock function is enabled regardless of key types is determined.

In step S906, the CPU 101 displays the error screen 805. After the error screen 805 is displayed, the top screen 301 or the administrative setting screen 802 may be displayed.

Basically the process in FIG. 9 is also operated in setting the initial password on the remote screen of the client terminal 108, except that in place of step S701, the CPU 101 waits until the edit button 421 of the setting change screen 420 is pressed. If it is determined that the edit button 421 is pressed, in step S705, the setting change screen 430 is displayed.

In the first exemplary embodiment, a set initial password and an enabled keylock function are controlled not to coincide. This avoids the inoperable state where the settings cannot be changed on the local UI due to the keylock function and operations cannot be performed on the remote UI because of the set initial password.

with the keylock function disabled, the second password can be changed back to the initial password.

A second exemplary embodiment will be described. In the first exemplary embodiment, the configuration is described where the administrative setting screen includes the setting items for changing the keylock function and the password setting. In the second exemplary embodiment, a configuration with the setting item "use remote UI" displayed on the administrative setting screen will be described. Specifically, while the remote UI function can be set only on the setting navigation function (FIG. 2) in the first exemplary embodiment, the remote UI function can be set on the administrative setting screen in the second exemplary embodiment.

If the setting item "use remote UI" is selected on the administrative setting screen 1002, the remote setting screen 203 is displayed, and the user can select whether to set the setting to use the remote UI. If the setting on the remote setting screen 203 is completed, a top screen 1001 is displayed.

<Processing of Preventing Remote UI Setting>

A process in preventing the remote UI setting will be described with reference to FIG. 11. The process is operated with the administrative setting screen 1002 displayed. Each step that is described above is given the same reference numeral, and redundant descriptions thereof are omitted. Further, the process is started with the remote UI enabled.

In step S1101, the CPU 101 determines which setting item is selected on the administrative setting screen 1002. If the setting item "lock setup key" is selected ("LOCK SETUP KEY" in step S1101), the processing in steps S702 to S704 are executed. If the setting item "system administrator password" is selected ("SYSTEM ADMINISTRATOR PASSWORD" in step S1101), the processing in steps S705 and S901 to S906 are executed.

Figure 10:
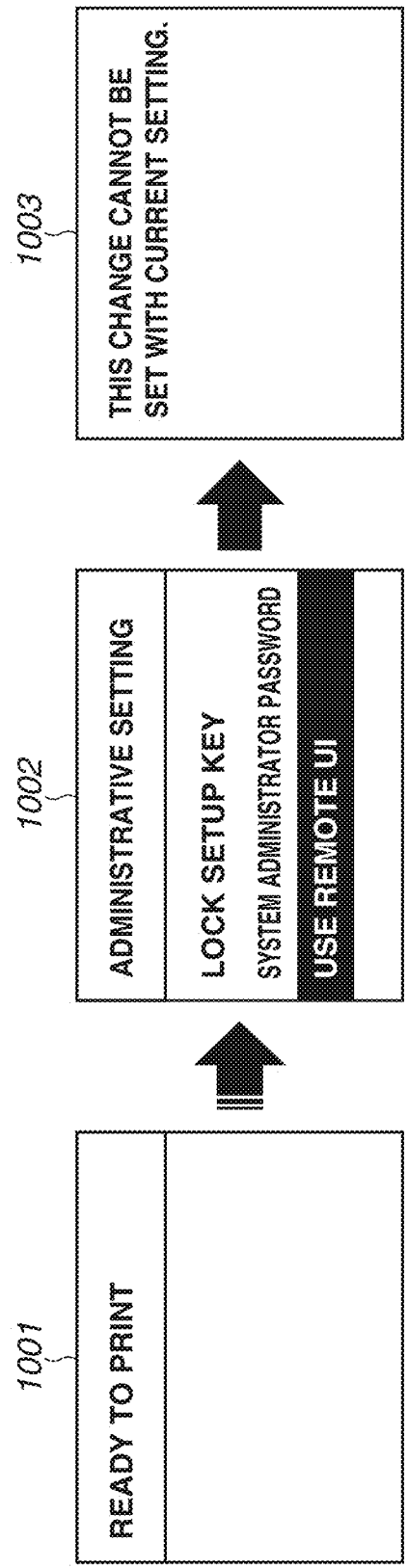
FIG. 10 illustrates a screen flow diagram in a case where a remote UI setting cannot be set according to one or more aspects of the present disclosure.

If the CPU 101 determines that the setting item "use remote UI" is selected in step S1101 ("USE REMOTE UI" in step S1101), in step S1102, the CPU 101 determines whether the keylock function of the image forming apparatus 100 is enabled. If the CPU 101 determines that the keylock function of the image forming apparatus 100 is enabled (YES in step S1102), the processing proceeds to step S1104, and an error screen 1003 is displayed. Examples of the error screen 1003 that is displayed are not limited to the form illustrated in FIG. 10, and any error screen that notifies the user, at least, that changes of the remote UI setting cannot be received may be provided.

On the other hand, if the CPU 101 determines that the keylock function of the image forming apparatus 100 is not enabled in step S1102 (NO in step S1102), the CPU 101 displays the remote setting screen 203 and receives changes of the remote UI setting, and the process is ended.

As shown in Table 1, with the keylock function set to "ON" and the remote UI setting set to "OFF", the image forming apparatus 100 is in the inoperable state. Thus, in the present exemplary embodiment, if it is determined that the keylock function is enabled, the remote UI setting is not set by the user regardless of the remote UI setting.

Figure 11:
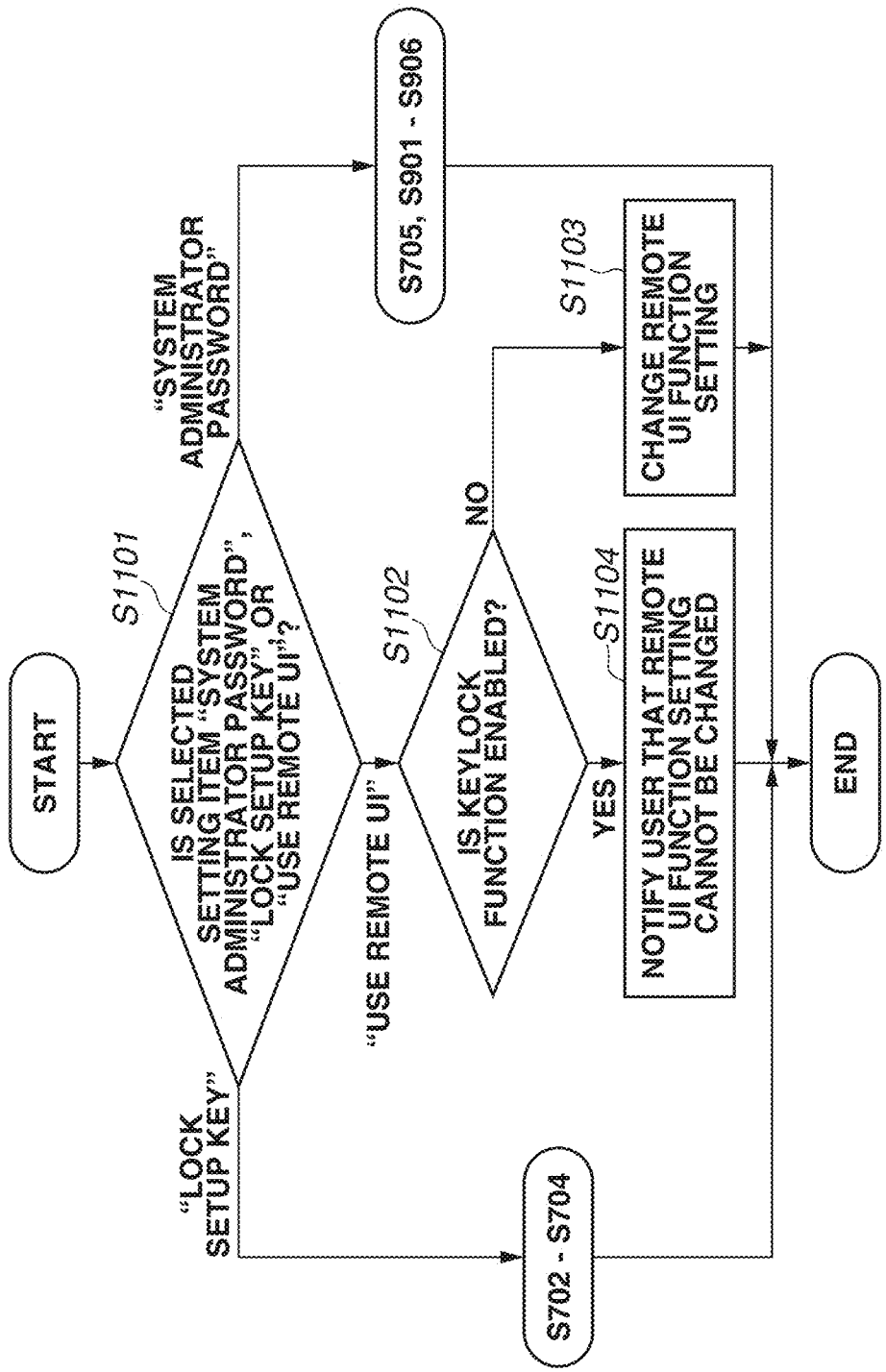
FIG. 11 is a flowchart in the case where the remote UI setting cannot be set according to one or more aspects of the present disclosure.

If the process in FIG. 11 is started with the remote UI setting set to "ON", a remote UI setting screen (remote setting screen 203) displayed with the keylock function enabled may cause the user to change the settings to bring the image forming apparatus 100 into the inoperable state. Thus, step S1104 is executed without displaying the remote setting screen 203.

In the second exemplary embodiment, if the keylock function is enabled, the settings of the image forming apparatus 100 can be changed only on the remote UI, so that the inoperable state is avoided by no changes of the remote UI setting being received.

A third exemplary embodiment will be described. In the first and second exemplary embodiments, the configurations are described that prevent the image forming apparatus 100 from being brought into the inoperable state by the settings of the image forming apparatus 100 being changed by a user operation. Specifically, an error screen is displayed when the user attempts to change the password setting or the keylock function setting.

However, conditions where the image forming apparatus 100 may be brought into the inoperable state are not limited to the settings changed by a user operation. For example, similar conditions may occur when a setting value file is imported to the image forming apparatus 100. The term "setting value file" refers to a file that includes at least one of a password setting value and a keylock function setting value.

If a setting value file is imported to the image forming apparatus 100 with a setting value set to the image forming apparatus 100, the image forming apparatus 100 may be brought into the inoperable state due to the combination of the imported setting value file and the set setting value. Specifically, if the setting value file including the setting value "ON" of the keylock setting is imported to the image forming apparatus 100 with the keylock function setting set to "OFF" and the initial password set, the keylock function setting of the image forming apparatus 100 is changed to "ON" and the set password becomes the initial password, so that the image forming apparatus 100 is brought into the inoperable state.

In the third exemplary embodiment, a configuration will be described that prevents the image forming apparatus 100 from being brought into the inoperable state as a result of importing the setting value file.

Figure 12:
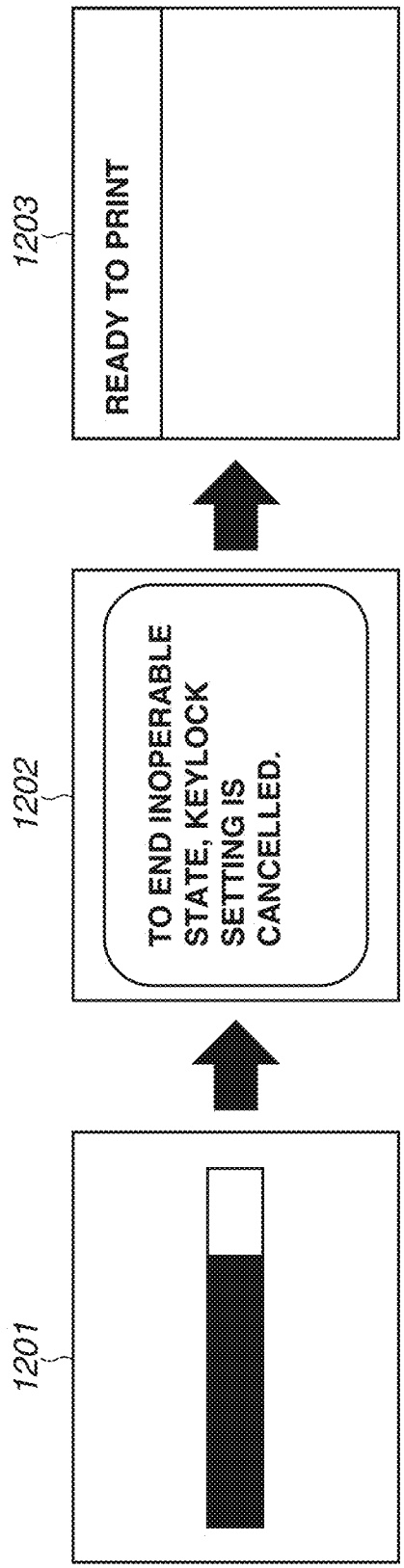
FIG. 12 illustrates a screen flow diagram for a recovery from an inoperable state according to one or more aspects of the present disclosure.

The image forming apparatus 100 is controlled to be reactivated automatically when a setting value file is imported. FIG. 12 illustrates the diagram of a screen flow operated that is triggered by the image forming apparatus 100 being reactivated after the setting value file is imported.

If reactivation processing is started, the CPU 101 displays a screen 1201 indicating that reactivation is proceeding. While the screen 1201 is being displayed, the CPU 101 determines whether the image forming apparatus 100 is in the inoperable state. Specifically, the CPU 101 checks the three settings "keylock function", "password", and "remote UI function" and determines whether the settings constitute a combination that brings the image forming apparatus 100 into the inoperable state. Combinations that bring the image forming apparatus 100 into the inoperable state are the three patterns (operation state is "X") shown in Table 1.

If the CPU 101 determines that the image forming apparatus 100 is not in the inoperable state, the imported setting value file is directly reflected in the image forming apparatus 100. On the other hand, if the CPU 101 determines that the image forming apparatus 100 is in the inoperable state, the keylock function is automatically cancelled. In this case, a screen 1202 is displayed.

Application of the third exemplary embodiment prevents the image forming apparatus 100 from being brought into the inoperable state after the setting value file is imported. Further, the screen 1202 is displayed to notify the user that the setting value is automatically changed while the inoperable state is cancelled.

A fourth exemplary embodiment will be described. In the first to third exemplary embodiments, the descriptions are about the configurations that avoid the inoperable state. In the fourth exemplary embodiment, a configuration will be described that ends the inoperable state of the image forming apparatus 100. In the present exemplary embodiment, a case will be described where a down key is an operation limitation target.

If the CPU 101 detects the press of the down key in step S1901, in step S1902, the CPU 101 determines whether the operation is a keylock function target operation. For example, whether the down key is pressed by the user is determined in step S1902. If the CPU 101 determines that the operation is not the target operation (NO in step S1902), in step S1907, the processing for the selected key is executed on the screen displayed in step S1901.

On the other hand, if the operation is a limitation target operation (YES in step S1902), in step S1903, an authentication information entry screen is displayed. If authentication is successful on the authentication information entry screen (YES in step S1904), in step S1907, the processing for the selected key is executed on the screen displayed in step S1901. On the other hand, if authentication fails on the authentication information entry screen (NO in step S1904), in step S1905, a notification screen indicating that the operation cannot be performed is displayed, and in step S1906, the screen displayed in step S1901 is displayed. While authentication is performed with preset authentication information in the present exemplary embodiment, a method in which a password for cancelling the keylock function is set and authentication is performed with the set password may be employed.

FIG. 20 illustrates a screen flow diagram for the process operated in FIG. 19. In the fourth exemplary embodiment, an administrator password "1234" is preset, and the password is used to cancel the keylock function.

If a press of the down key is detected on a home screen 2001, the home screen 2001 is changed to an authentication information entry screen 2002. If a correct password is entered and an OK key is pressed on the authentication information entry screen 2002, authentication is performed. If authentication is successful, the keylock function is cancelled, and the processing for the down key is performed on the home screen 2001, and the item "setting registration" is focused (2003). On the authentication information entry screen 2002, the entered password may be displayed in a hidden state, such as "****", so that the password cannot be recognized externally.

Figure 21:
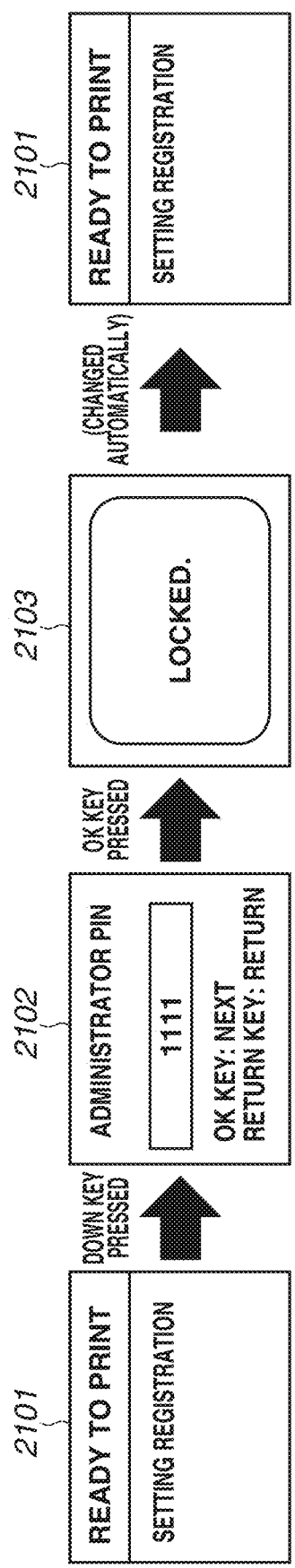
FIG. 21 illustrates a screen flow diagram for a failure in a cancel of the limitation function according to one or more aspects of the present disclosure.

FIG. 21 illustrates a screen flow diagram for a failure in an authentication on the authentication information entry screen 2002.

If a press of the down key is detected on a home screen 2101, the home screen 2101 is changed to an authentication information entry screen 2102. If an incorrect password is entered and an OK key is pressed on the authentication information entry screen 2102, authentication fails, and a notification screen 2103 indicating that the operation is a limitation target is displayed for a predetermined period of time, and thereafter the home screen 2101 is automatically displayed.

The screen flow described above represents a process for ending the inoperable state on the image forming apparatus 100 in the inoperable state and a screen flow for the process. Application of the fourth exemplary embodiment makes it possible to cancel the keylock function on an operation panel, improving convenience. Furthermore, that manner makes the remote UI no longer indispensable, avoiding the inoperable state that occurs under the conditions that the remote UI cannot be used and that the keylock function is enabled.

Figure 22:
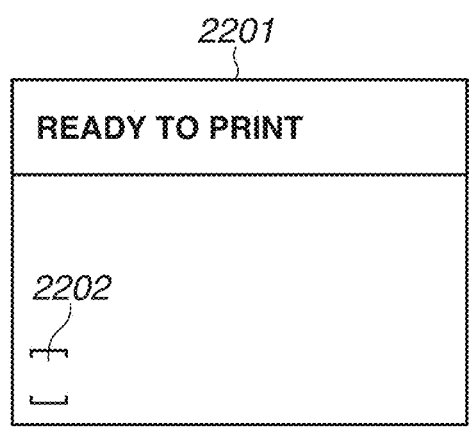
FIG. 22 illustrates a home screen in a limitation function disabling mode according to one or more aspects of the present disclosure.

A fifth exemplary embodiment will be described. In the configuration described in the fourth exemplary embodiment, with a correct password entered on the authentication information entry screen 2102, the keylock is cancelled, and the processing for the locked key is executed. In the fifth exemplary embodiment, a method will be described with reference to FIG. 22 that temporarily disables the keylock function, enabling a key operation without authentication or cancelling the keylock function.

An image forming apparatus according to the fifth exemplary embodiment includes a function of operating in an operation mode different from the modes in a normal operation, which is referred to as "special mode function". The special mode function is executed by an image forming apparatus being activated while a specific key is being pressed. A keylock function disabling mode in the present exemplary embodiment is a special mode function that enables the image forming apparatus to be operated regardless of keylock function settings while the keylock function disabling mode is executed. The user can perform a desired operation on the image forming apparatus in the mode and does not have to change the setting of the keylock function. If the image forming apparatus is turned off and is normally started with no keys pressed, the keylock function is restored to a state corresponding to the device setting.

If the image forming apparatus is started using a special activation method, a special mode mark 2202 is displayed at the lower left of a home screen 2201 after the start. With the special mode function in operation, the special mode mark 2202 is always displayed at this position on any of the changed screens.

Figure 23:
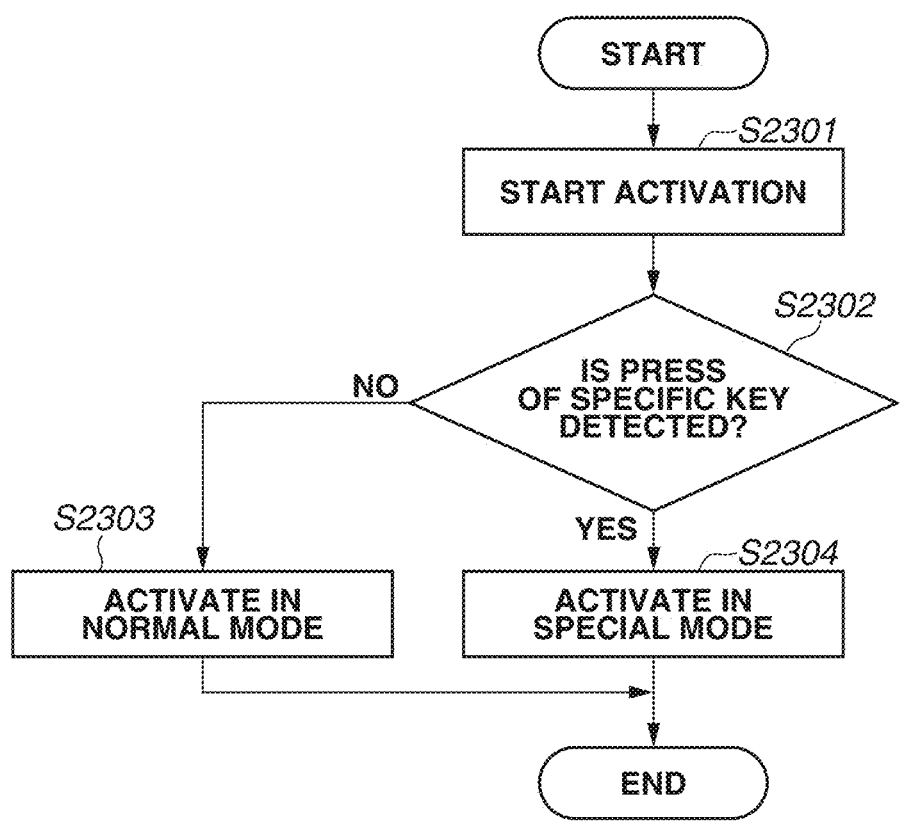
FIG. 23 is a flowchart for an activation of the limitation function disabling mode according to one or more aspects of the present disclosure.

FIG. 23 is a flowchart illustrating a method of calling the special mode function according to the fifth exemplary embodiment of the present disclosure.

In step S2301, if the image forming apparatus is turned on, the CPU 101 starts activation processing. Next, in step S2302, the CPU 101 determines whether a specific key is pressed during the activation processing. If no keys are pressed or a disabled key is pressed (NO in step S2302), in step S2303, the image forming apparatus is activated in a normal mode. On the other hand, if a specific key is pressed during the activation processing (YES in step S2302), in step S2304, the image forming apparatus is activated in a special mode assigned to the pressed key.

By applying the fifth exemplary embodiment, the keylock function is temporarily disabled without a cancel of the keylock function, and a desired setting change operation can be performed.

Other Exemplary Embodiments

In the first exemplary embodiment, a configuration that prevents the initial password from being set on the password setting screen 204 of the setting navigation function may be employed. For example, if a user instruction not to change the initial password or a user instruction to set the same character string as the initial password as a password is issued on the password setting screen 204 after "YES" is selected on the remote setting screen 203, an error screen (not illustrated) may be displayed without a change to the password confirmation screen 205. The error screen displays a message indicating that the remote UI cannot be used with the initial password remaining set.

On the other hand, with "NO" selected on the remote setting screen 203, the password confirmation screen 205 is displayed, and use of the image forming apparatus 100 is started even if the initial password is not changed or the same character string as the initial password is set as a password on the password setting screen 204.

Figure 13:
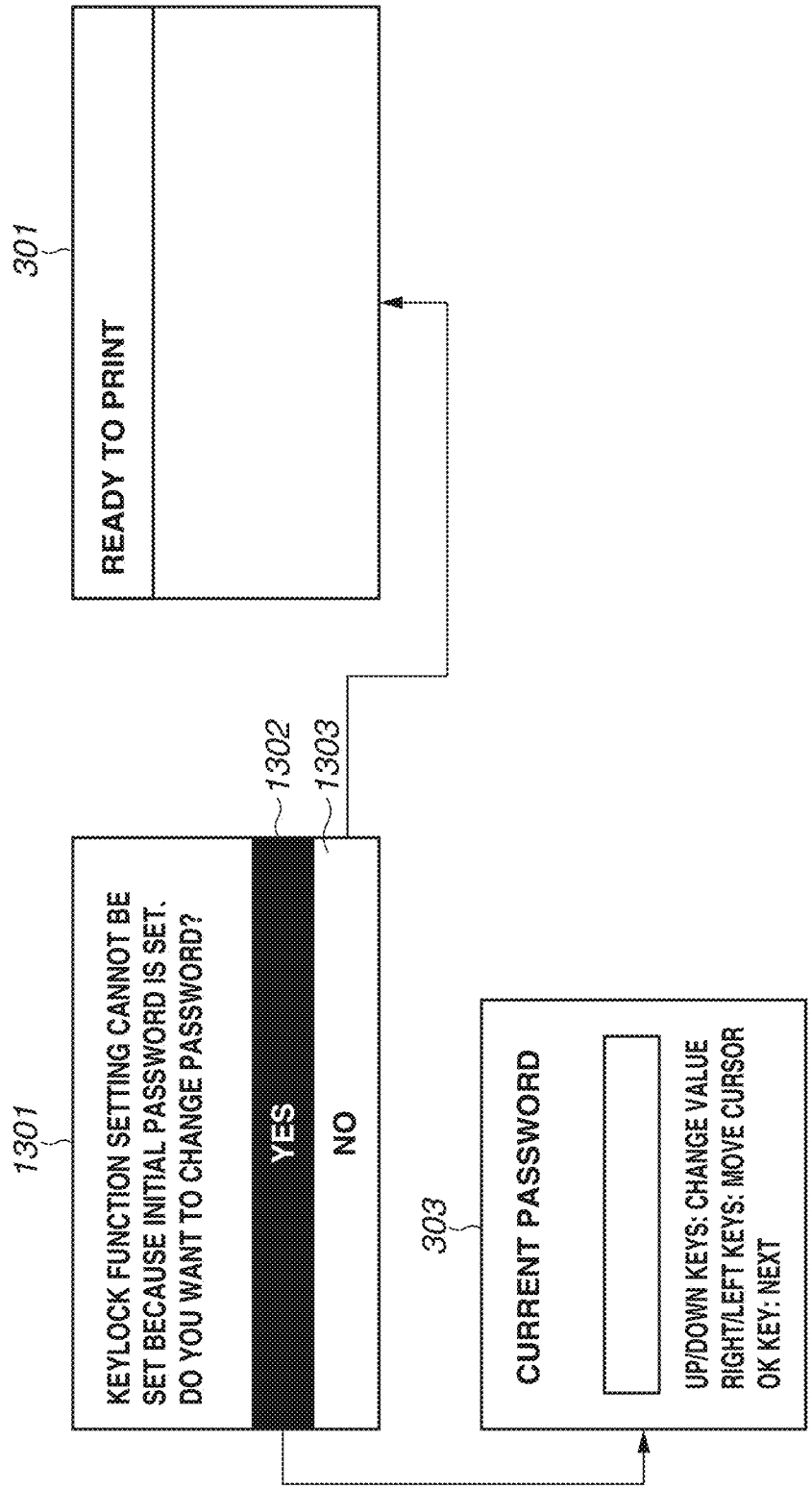
FIG. 13 illustrates a screen flow diagram in a case where a remote UI setting cannot be set according to one or more aspects of the present disclosure.

Further, in FIG. 6 in the first exemplary embodiment, after the error screen 603 is displayed, the top screen 601 or the administrative setting screen 602 is displayed. Alternatively, the password entry screen 303 may be displayed to prompt the user to change the password setting after the error screen 603 is displayed. Alternatively, in place of the error screen 603, a screen 1301 (FIG. 13) may be displayed to prompt the user to change the password change. If a selection item 1302 is selected on the screen 1301, the screen 1301 is changed to the password entry screen 303, and the screen flow thereafter is identical to that in FIGS. 3 (304 to 306). After the screen 306 is displayed, the administrative setting screen 302 or the lock setting screen 504 may be displayed to prompt the user to set the keylock function setting.

If a selection item 1303 is selected on the screen 1301, the top screen 301 may be displayed.

Figure 14:
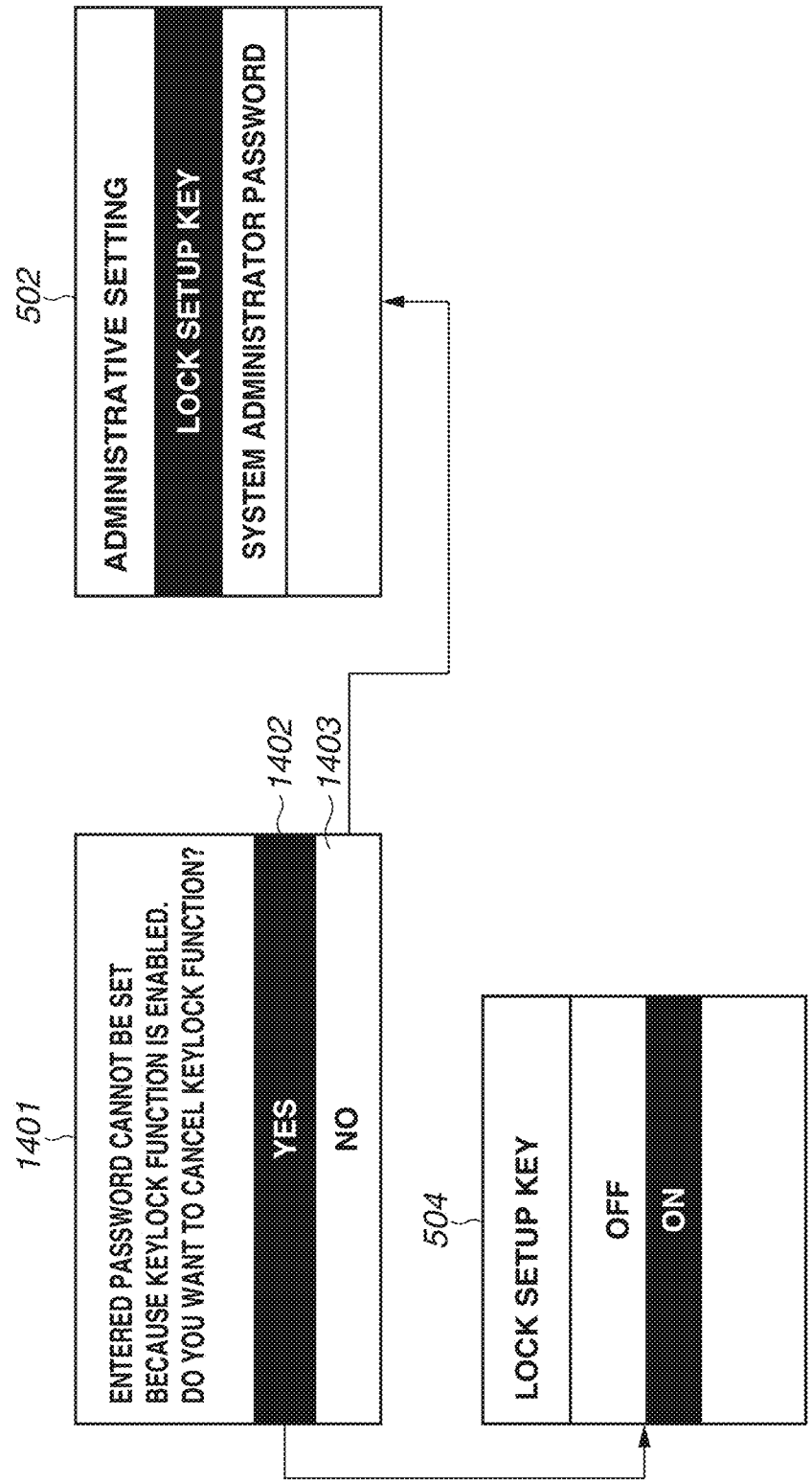
FIG. 14 illustrates a screen flow diagram in a case where an initial password setting cannot be set according to one or more aspects of the present disclosure.

Further, in FIG. 8 in the first exemplary embodiment, after the error screen 805 is displayed, the top screen 801 or the administrative setting screen 802 is displayed. Alternatively, the lock setting screen 504 may be displayed to prompt the user to cancel the keylock function after the error screen 805 is displayed. Alternatively, in place of the error screen 805, a screen 1401 (FIG. 14) may be displayed to prompt the user to cancel the keylock function. If a selection item 1402 is selected, the lock setting screen 504 may be displayed, or the keylock function may automatically be cancelled at a timing at which the selection of the selection item 1402 is established. After the selection item 1402 is selected and the keylock function is cancelled, the password entry screen 303 is displayed so that an operation of changing the password setting is continued.

If a selection item 1403 is selected on the screen 1401, the administrative setting screen 502 or the top screen 801 may be displayed.

Further, while a notification that the setting the user desires cannot be set is displayed on the UI screen, the UI screen does not have to be used, and a sound or a blinking LED lamp may be provided.

Figure 15:
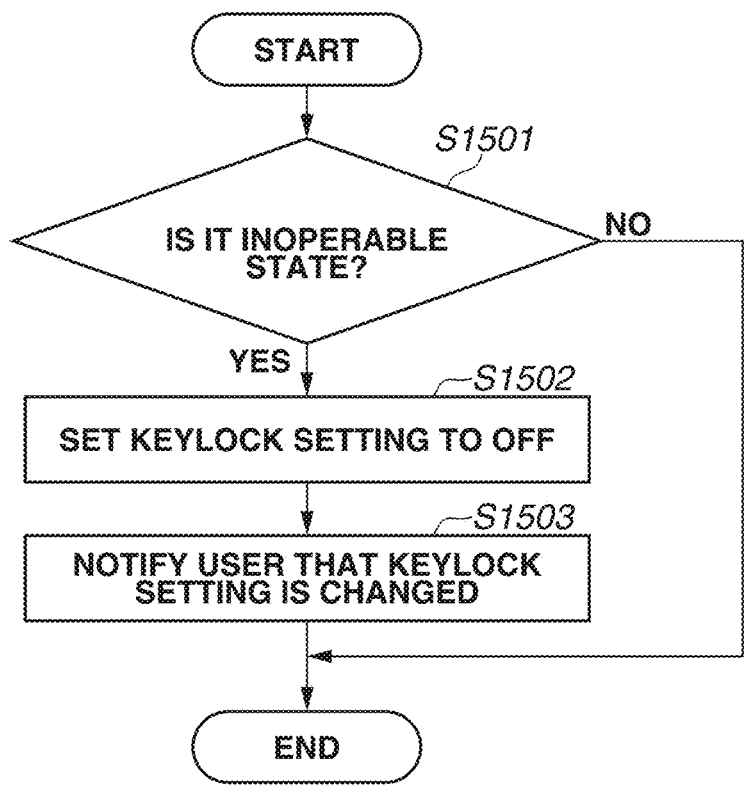
FIG. 15 illustrates a reactivation process after a process of importing a setting value file according to one or more aspects of the present disclosure.

Further, another process as illustrated in FIG. 15 may be provided. Specifically, after it is determined that the image forming apparatus is in the inoperable state in step S1501, in step S1502, the keylock setting is automatically set to OFF, and in step S1503, a notification that the keylock setting is automatically changed is provided to the user.

Further, while step S907 in FIG. 9 is the processing of determining whether the keylock function setting is enabled regardless of key types, step S907 may be the processing of determining whether the keylock function of the setup key 1704 is enabled.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An information processing apparatus including an operation device and a network interface and having a keylock function that is a function of restricting a setting operation using one or more keys on the operation device, the information processing apparatus comprising:
    a reception unit configured to receive, via the network interface, an instruction corresponding to a remote operation;
    a change unit configured to change an administrator password from an initial password to a different password, wherein, in a case where the administrator password is the initial password, a change of the initial password based on the instruction corresponding to the remote operation is restricted; and
    a control unit configured to execute process so that the keylock function is not enabled without the change of the initial password made by the change unit,
    wherein, in a case where a predetermined instruction based on a user operation via an operation unit is received, the change unit changes the administrator password from the initial password to a different password,
    wherein, after the change of the initial password made by the change unit, the keylock function can be enabled, and
    wherein, in a case where the reception unit receives a cancellation instruction of the keylock function as the instruction corresponding to the remote operation, the keylock function in an enabled state is disabled.

2. The information processing apparatus according to claim 1, wherein, in a case where the administrator password is the initial password, in response to the keylock function being selected with a user operation, a message indicating that the keylock function is not enabled is displayed.

3. The information processing apparatus according to claim 1, wherein the initial password is set to the information processing apparatus prior to shipment.

4. A control method for an information processing apparatus including an operation device and a network interface and having a keylock function that is a function of restricting a setting operation using one or more keys on the operation device, the control method comprising:
    receiving, via the network interface, an instruction corresponding to a remote operation;

changing an administrator password from an initial password to a different password, wherein, in a case where the administrator password is the initial password, a change of the initial password based on the instruction corresponding to the remote operation is restricted; and executing process so that the keylock function is not enabled without the change of the initial password made by the changing, wherein, in a case where a predetermined instruction based on a user operation via an operation unit is received, the changing changes the administrator password from the initial password to a different password, wherein, after the change of the initial password made by the changing, the keylock function can be enabled, and wherein, in a case where the receiving receives a cancellation instruction of the keylock function as the instruction corresponding to the remote operation, the keylock function in an enabled state is disabled.

5. The information processing apparatus according to claim 1, wherein the one or more keys include at least one software key and/or at least one hardware key.

\* \* \* \* \*